(12) United States Patent
Yuda

(10) Patent No.: US 10,291,330 B2
(45) Date of Patent: May 14, 2019

(54) OPTICAL TRANSCEIVER, OPTICAL COMMUNICATION APPARATUS, AND METHOD OF CONTROLLING LIGHT RECEIVING ELEMENT

(71) Applicant: SUMITOMO ELECTRIC INDUSTRIES, LTD., Osaka-shi, Osaka (JP)

(72) Inventor: Shuitsu Yuda, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/543,303

(22) PCT Filed: Jan. 5, 2016

(86) PCT No.: PCT/JP2016/050087
§ 371 (c)(1),
(2) Date: Jul. 13, 2017

(87) PCT Pub. No.: WO2016/170801
PCT Pub. Date: Oct. 27, 2016

(65) Prior Publication Data
US 2018/0006728 A1  Jan. 4, 2018

(30) Foreign Application Priority Data

Apr. 20, 2015 (JP) ................................. 2015-085659

(51) Int. Cl.
*H04B 10/58* (2013.01)
*H04B 10/50* (2013.01)
(Continued)

(52) U.S. Cl.
CPC ............ *H04B 10/58* (2013.01); *H04B 10/40* (2013.01); *H04B 10/504* (2013.01); *H04B 10/6911* (2013.01)

(58) Field of Classification Search
CPC .. H04B 10/58; H04B 10/6911; H04B 10/504; H04B 10/40
See application file for complete search history.

(56) References Cited

U.S. PATENT DOCUMENTS

2007/0053699 A1* 3/2007 Ichino .................... H04B 10/66
398/208

FOREIGN PATENT DOCUMENTS

JP   2006-302967 A   11/2006
JP   2009-105489 A    5/2009

OTHER PUBLICATIONS

IEEE Std 802.3ah™—2004, Chapter 64, "Multi-point MAC Control," pp. 421-476.

* cited by examiner

*Primary Examiner* — Leslie C Pascal
(74) *Attorney, Agent, or Firm* — Drinker Biddle & Reath LLP

(57) ABSTRACT

An optical communication apparatus according to an embodiment of the present invention includes: a light emitting element; a transmission driver that drives the light emitting element; a light receiving element capable of changing a multiplication factor by a bias voltage; a temperature sensor; a computing unit that calculates a drive rate of the transmission driver; and an adjusting unit that adjusts the bias voltage applied to the light receiving element. The adjusting unit adjusts the bias voltage by linear computation using a plurality of target values of the bias voltage for combinations of a plurality of temperatures and a plurality of (Continued)

drive rates, based on a temperature detected by the temperature sensor and a result of calculation of the drive rate.

7 Claims, 27 Drawing Sheets

(51) Int. Cl.
*H04B 10/40* (2013.01)
*H04B 10/69* (2013.01)

FIG. 18

TRANSMISSION ON STATE — ta1

| TEMPERATURE [°C] | CONTROL DIGITAL VALUE |
|---|---|
| -30 | x1 |
| -28 | x2 |
| -26 | x3 |
| ⋮ | ⋮ |
| -2 | x15 |
| 0 | x16 |
| 2 | x17 |
| ⋮ | ⋮ |
| 26 | x29 |
| 28 | x30 |
| 30 | x31 |
| ⋮ | ⋮ |
| 72 | x52 |
| 74 | x53 |
| 76 | x54 |
| ⋮ | ⋮ |
| 92 | x62 |
| 94 | x63 |

FIG. 19

TRANSMISSION OFF STATE ta2

| TEMPERATURE [°C] | CONTROL DIGITAL VALUE |
|---|---|
| −30 | y1 |
| −28 | y2 |
| −26 | y3 |
| ⋮ | ⋮ |
| −2 | y15 |
| 0 | y16 |
| 2 | y17 |
| ⋮ | ⋮ |
| 26 | y29 |
| 28 | y30 |
| 30 | y31 |
| ⋮ | ⋮ |
| 72 | y52 |
| 74 | y53 |
| 76 | y54 |
| ⋮ | ⋮ |
| 92 | y62 |
| 94 | y63 |

US 10,291,330 B2

OPTICAL TRANSCEIVER, OPTICAL COMMUNICATION APPARATUS, AND METHOD OF CONTROLLING LIGHT RECEIVING ELEMENT

TECHNICAL FIELD

The present invention relates to an optical transceiver, an optical communication apparatus, and a method of controlling a light receiving element, and particularly relates to an optical transceiver including a light emitting element and a light receiving element, an optical communication apparatus, and a method of controlling the light receiving element.

BACKGROUND ART

In recent years, the Internet has been widely spread, and a user can access various information on websites operated in various locations in the world and can thereby acquire the information. Accordingly, apparatuses capable of performing broadband access such as ADSL (Asymmetric Digital Subscriber Line) and FTTH (Fiber To The Home) have also begun to be rapidly spread.

IEEE Std 802.3ah (registered trademark)—2004 (Non-Patent Literature 1) discloses one system of a passive optical network (PON) which is medium-sharing communication where a plurality of optical network units (ONUs) perform data transmission with an optical line terminal (OLT) by sharing an optical communication line. Namely, there are defined EPON (Ethernet (registered trademark) PON) where all information including user information passing through a PON and control information for managing and operating the PON is communicated in Ethernet (registered trademark) frame format; and an EPON access control protocol (MPCP (Multi-Point Control Protocol)) and an OAM (Operations Administration and Maintenance) protocol. By exchanging MPCP frames between the optical line terminal and an optical network unit, subscription, unsubscription, multiple upstream access control, and the like, of the optical network unit are performed. In addition, Non-Patent Literature 1 describes a method of registering a new optical network unit, REPORT indicating a bandwidth allocation request, and GATE indicating a transmission instruction, which use MPCP messages.

Note that in 10G-EPON, too, i.e., EPON with a communication speed equivalent to 10 gigabits/second, which is standardized in IEEE802.3av (registered trademark)—2009 as the next generation technology of GE-PON (Giga Bit Ethernet (registered trademark) Passive Optical Network) which is EPON that achieves a communication speed of 1 gigabit/second, an access control protocol is premised on MPCP.

Meanwhile, to implement long-distance optical transmission in a PON system, etc., for example, an avalanche photodiode (APD) with high light receiving sensitivity is used as a light receiving element. The APD is a light receiving element having current amplifying action. In order for the APD to accurately maintain a carrier multiplication factor, i.e., multiplication factor, having a strong temperature dependence, a reverse bias voltage applied to the APD needs to be adjusted according to the temperature of the APD.

For a technique for adjusting the reverse bias voltage applied to the APD, for example, Japanese Unexamined Patent Publication No. 2009-105489 (Patent Literature 1) discloses a configuration as shown below. Specifically, a transmission/reception integral type optical transceiver that transmits and receives optical signals includes an optical transmission sub-assembly including a laser diode; an optical reception sub-assembly including an avalanche photodiode; a first control circuit that has a temperature sensor mounted thereon and that drives the laser diode based on an output signal from the temperature sensor; and a second control circuit that controls a bias voltage of the avalanche photodiode. The second control circuit controls the bias voltage based on a temperature correction value which is obtained by adding a predetermined offset value to an output from the temperature sensor.

CITATION LIST

Non-Patent Literature

Non-Patent Literature 1; IEEE Std 802.3ah (registered trademark)—2004

Patent Literature

Patent Literature 1; Japanese Unexamined Patent Publication No. 2009-105489

SUMMARY OF INVENTION

Technical Problem

The optical transceiver described in Patent Literature 1 performs feedforward control using the temperature sensor and a lookup table for temperatures within the optical transceiver.

However, for example, when the optical transceiver performs different operations according to the communication state, and accordingly, the power consumption changes and the amount of heat generated changes, the temperature detected by the above-described temperature sensor also changes.

In such a case, even if the optical transceiver performs feedforward control using the lookup table such as that described above, it is difficult to favorably adjust the reverse bias voltage applied to the APD, according to the temperature of the APD.

The invention is made to solve the above-described problem, and an object of the invention is to provide an optical transceiver, an optical communication apparatus, and a method of controlling a light receiving element that are capable of favorably adjusting a bias voltage applied to the light receiving element.

Solution to Problem

To solve the above-described problem, an optical transceiver according to one aspect of the invention includes a temperature sensor; an integrated circuit capable of performing a computation process using a temperature detected by the temperature sensor; an optical module including a light emitting element and a light receiving element; a transmission driver that drives the light emitting element; and a casing that has thermal conductivity and accommodates the temperature sensor, the integrated circuit, the optical module, and the transmission driver, and a difference between a temperature detected by the temperature sensor in a transmission on state of an optical signal by the light emitting element and a temperature detected by the temperature sensor in a transmission off state of the optical signal is greater than 2° C., and power consumption of the transmission driver is higher than power consumption of the integrated circuit and power consumption of the optical module.

To solve the above-described problem, an optical transceiver according to one aspect of the invention includes a first temperature sensor; a second temperature sensor; an optical module including a light emitting element and a light receiving element; a transmission driver that drives the light emitting element, the second temperature sensor being thermally coupled to the transmission driver; and a casing that has thermal conductivity and accommodates the first temperature sensor, the second temperature sensor, the optical module, and the transmission driver, and a drive rate of the transmission driver is set as a, a temperature detected by the first temperature sensor is set as T1, a temperature detected by the second temperature sensor is set as T2, a temperature of a light receiving unit in the optical module is set as Tr, and a temperature error allowed for control of the light receiving unit in the optical module is set as Terr, and when, in a state in which an ambient temperature of the casing in a transmission on state of an optical signal by the light emitting element is a predetermined temperature, a value of Tr that can be estimated from T1 and T2 with a being a minimum value is set as Tmin, and a value of Tr that can be estimated from T1 and T2 with a being a maximum value is set as Tmax, an error in a measured value of Tr with respect to an estimated value of Tr is Terr or less, the estimated value being obtained by internally dividing Tmin and Tmax by a when a is a median value of the minimum value and the maximum value.

To solve the above-described problem, an optical communication apparatus according to one aspect of the invention includes a light emitting element; a transmission driver that drives the light emitting element; a light receiving element capable of changing a multiplication factor by a bias voltage; a temperature sensor; a computing unit that calculates a drive rate of the transmission driver; and an adjusting unit that adjusts the bias voltage applied to the light receiving element, and the adjusting unit adjusts the bias voltage by linear computation using a plurality of target values of the bias voltage for combinations of a plurality of temperatures and a plurality of drive rates, based on a temperature detected by the temperature sensor and a result of calculation of the drive rate.

To solve the above-described problem, a method of controlling a light receiving element according to one aspect of the invention is a method of controlling a light receiving element in an optical communication apparatus including a light emitting element; a transmission driver that drives the light emitting element; a light receiving element capable of changing a multiplication factor by a bias voltage; and a temperature sensor, and includes the steps of: calculating a drive rate of the transmission driver; and adjusting the bias voltage applied to the light receiving element, and in the step of adjusting the bias voltage, the bias voltage is adjusted by linear computation using a plurality of target values of the bias voltage for combinations of a plurality of temperatures and a plurality of drive rates, based on a temperature detected by the temperature sensor and a result of calculation of the drive rate.

The present invention can be implemented not only as an optical transceiver or optical communication apparatus that includes such characteristic processing units, but also as a program for causing a computer to perform the steps of such a characteristic process. In addition, the present invention can be implemented as a semiconductor integrated circuit that implements a part or all of an optical transceiver or optical communication apparatus, or can be implemented as a system including an optical transceiver or optical communication apparatus.

Advantageous Effects of Invention

According to the present invention, a bias voltage applied to a light receiving element can be favorably adjusted.

BRIEF DESCRIPTION OF DRAWINGS

FIG. 18 is a diagram showing an example of a lookup table used for control of the reverse bias voltage in the optical transceiver according to the first embodiment of the present invention.

FIG. 19 is a diagram showing an example of a lookup table used for control of the reverse bias voltage in the optical transceiver according to the first embodiment of the present invention.

DESCRIPTION OF EMBODIMENTS

Figure 1:
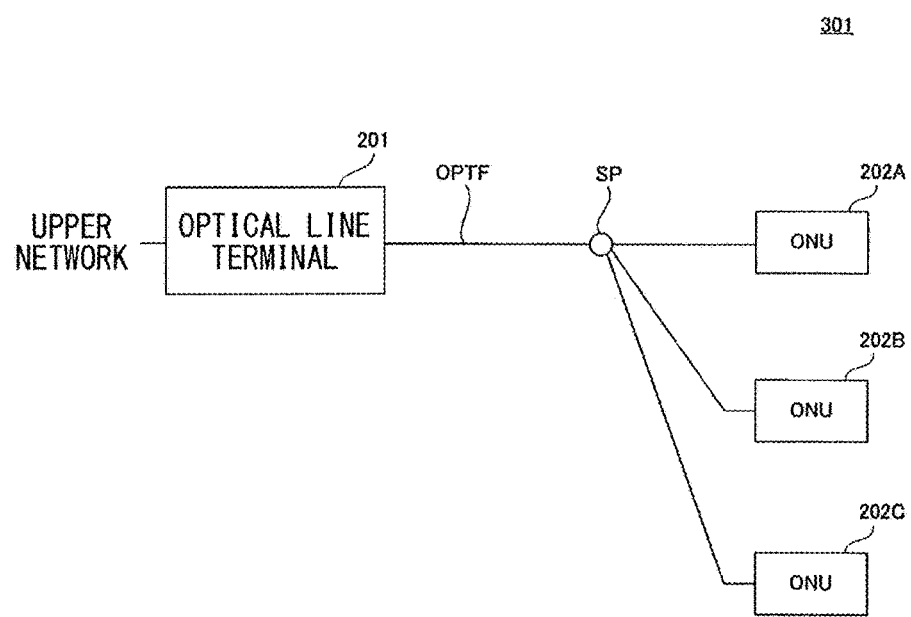
FIG. 1 is a diagram showing a configuration of a PON system according to a first embodiment of the present invention.

First, the content of embodiments of the present invention will be listed and described.

(1) An optical transceiver according to an embodiment of the present invention includes a temperature sensor; an integrated circuit capable of performing a computation process using a temperature detected by the temperature sensor; an optical module including a light emitting element and a light receiving element; a transmission driver that drives the light emitting element; and a casing that has thermal conductivity and accommodates the temperature sensor, the integrated circuit, the optical module, and the transmission driver. A difference between a temperature detected by the temperature sensor in a transmission on state of an optical signal by the light emitting element and a temperature detected by the temperature sensor in a transmission off state of the optical signal is greater than 2° C., and power consumption of the transmission driver is higher than power consumption of the integrated circuit and power consumption of the optical module.

As such, the optical transceiver is configured such that the power consumption, i.e., heat generation, of the transmission driver is predominant in the casing having thermal conductivity, and the heat generation causes a temperature rise of the integrated circuit and the optical module. That is, the optical transceiver is in conditions where a large amount of power consumption is provided to the transmission driver; in other words, the optical transceiver can output a high-strength optical signal or output a high-speed optical signal. The optical transceiver has a configuration suitable for use in the following (5) optical communication apparatus that adjusts the bias voltage by linear computation using a plurality of target values of the bias voltage. Namely, the optical transceiver and the following (5) optical communication apparatus are suitable for combination use and have the same or corresponding special technical features. Therefore, the optical transceiver according to the embodiment of the present invention can favorably adjust the bias voltage applied to the light receiving element.

(2) Preferably, the transmission driver is disposed between the temperature sensor and the optical module.

As such, the optical transceiver including the temperature sensor that is disposed at a location where the temperature sensor is susceptible to the transmission driver and it is difficult for the temperature sensor to measure an accurate temperature of the optical module can favorably adjust the bias voltage applied to the light receiving element.

(3) Preferably, a distance between the temperature sensor and the optical module is less than or equal to a distance between the transmission driver and the optical module.

As such, in a configuration in which the temperature sensor and the optical module are brought close to each other so that the temperature sensor can more accurately simulate the temperature of the optical module, the influence exerted on the optical module by the transmission driver is accurately grasped and the bias voltage applied to the light receiving element can be favorably adjusted according to the temperature of the light receiving element.

(4) An optical transceiver according to an embodiment of the present invention includes a first temperature sensor; a second temperature sensor; an optical module including a light emitting element and a light receiving element; a transmission driver that drives the light emitting element, the second temperature sensor being thermally coupled to the transmission driver; and a casing that has thermal conductivity and accommodates the first temperature sensor, the second temperature sensor, the optical module, and the transmission driver. A drive rate of the transmission driver is set as a, a temperature detected by the first temperature sensor is set as T1, a temperature detected by the second temperature sensor is set as T2, a temperature of a light receiving unit in the optical module is set as Tr, and a temperature error allowed for control of the light receiving unit in the optical module is set as Terr, and when, in a state in which an ambient temperature of the casing in a transmission on state of an optical signal by the light emitting element is a predetermined temperature, a value of Tr that can be estimated from T1 and T2 with a being a minimum value is set as Tmin, and a value of Tr that can be estimated from T1 and T2 with a being a maximum value is set as Tmax, an error in a measured value of Tr with respect to an estimated value of Tr is Terr or less, the estimated value being obtained by internally dividing Tmin and Tmax by a when a is a median value of the minimum value and the maximum value.

As such, in the optical transceiver, the casing having thermal conductivity is provided and a thermal coupling state between a heat generating portion, i.e., the transmission driver, and the first temperature sensor and the second temperature sensor is accurately achieved, by which a favorable thermal coupling state can be achieved that allows an error in the temperature Tr of the light receiving unit in the optical module to be Terr or less. Then, by applying a bias voltage appropriate to an accurately estimated temperature Tr of the light receiving unit to the light receiving element, the multiplication factor is adjusted according to the temperature of the light receiving element, enabling to maintain an optimal value. Namely, the optical transceiver has a configuration suitable for use in the following (5) optical communication apparatus that adjusts the bias voltage by linear computation using a plurality of target values of the bias voltage. Namely, the optical transceiver and the following (5) optical communication apparatus are suitable for combination use and have the same or corresponding special technical features. Therefore, the optical transceiver according to the embodiment of the present invention can favorably adjust the bias voltage applied to the light receiving element.

(5) An optical communication apparatus according to an embodiment of the present invention includes a light emitting element; a transmission driver that drives the light emitting element; a light receiving element capable of changing a multiplication factor by a bias voltage; a temperature sensor; a computing unit that calculates a drive rate of the transmission driver; and an adjusting unit that adjusts the bias voltage applied to the light receiving element. The adjusting unit adjusts the bias voltage by linear computation using a plurality of target values of the bias voltage for combinations of a plurality of temperatures and a plurality of drive rates, based on a temperature detected by the temperature sensor and a result of calculation of the drive rate.

By such a configuration, even when an optical transceiver performs different operations according to the communication state, specifically, for example, operations with different burst duty ratios of a burst optical signal, and accordingly, the power consumption changes and the amount of heat generated changes, the optical transceiver can perform control according to a change in temperature detected by the temperature sensor. Specifically, for example, by performing feedforward control using lookup tables, according to the temperature detected by the temperature sensor and the duty ratio, the bias voltage applied to the light receiving element can be favorably adjusted according to the temperature of the light receiving element. Therefore, the optical communication apparatus according to the embodiment of the present invention can favorably adjust the bias voltage applied to the light receiving element.

(6) A method of controlling a light receiving element according to an embodiment of the present invention is a method of controlling a light receiving element in an optical communication apparatus including a light emitting element; a transmission driver that drives the light emitting element; a light receiving element capable of changing a multiplication factor by a bias voltage; and a temperature sensor, and includes the steps of: calculating a drive rate of the transmission driver; and adjusting the bias voltage applied to the light receiving element. In the step of adjusting the bias voltage, the bias voltage is adjusted by linear computation using a plurality of target values of the bias voltage for combinations of a plurality of temperatures and a plurality of drive rates, based on a temperature detected by the temperature sensor and a result of calculation of the drive rate.

By this, even when an optical transceiver performs different operations according to the communication state, specifically, for example, operations with different burst duty ratios of a burst optical signal, and accordingly, the power consumption changes and the amount of heat generated changes, the optical transceiver can perform control according to a change in temperature detected by the temperature sensor. Specifically, for example, by performing feedforward control using lookup tables, according to the temperature detected by the temperature sensor and the duty ratio, the bias voltage applied to the light receiving element can be favorably adjusted according to the temperature of the light receiving element. Therefore, in the method of controlling a light receiving element according to the embodiment of the present invention, the bias voltage applied to the light receiving element can be favorably adjusted.

The embodiments of the present invention will be described below using the drawings. Note that the same or corresponding portions in the drawings are denoted by the same reference signs and description thereof is not repeated. Note also that at least a part of the embodiments described below may be arbitrarily combined.

First Embodiment

FIG. 1 is a diagram showing a configuration of a PON system according to a first embodiment of the present invention.

Referring to FIG. 1, a PON system 301 is, for example, 10G-EPON and includes ONUs 202A, 202B, and 202C, an optical line terminal 201 connected to an upper network, and a splitter SP. The ONUs 202A, 202B, and 202C and the optical line terminal 201 are connected to each other through the splitter SP and an optical fiber OPTF, and perform transmission and reception of optical signals therebetween.

Figure 2:
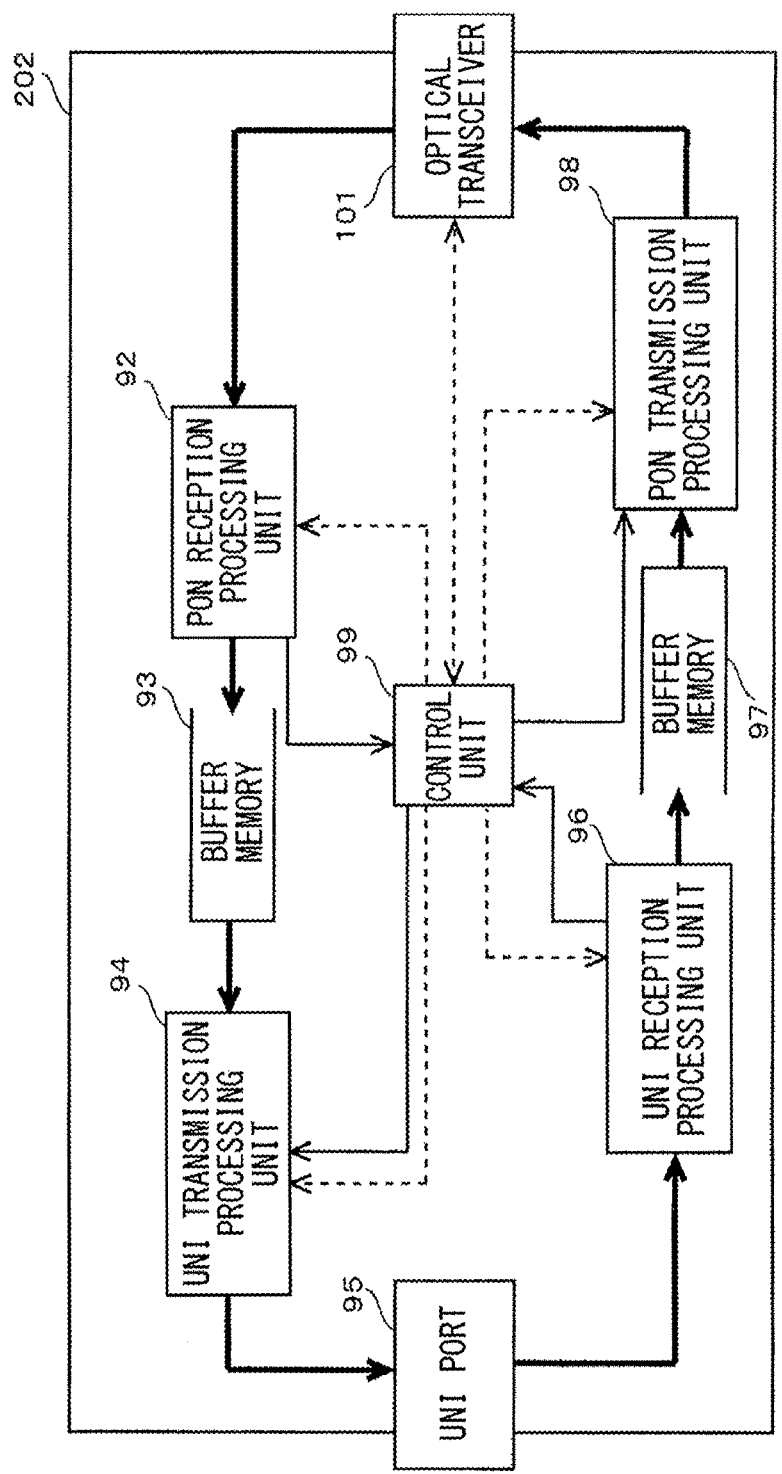
FIG. 2 is a diagram showing a configuration of an ONU in the PON system according to the first embodiment of the present invention.

FIG. 2 is a diagram showing a configuration of an ONU in the PON system according to the first embodiment of the present invention.

Referring to FIG. 2, an ONU 202 includes an optical transceiver 101, a PON reception processing unit 92, a buffer memory 93, a UN transmission processing unit 94, a UNI (User Network Interface) port 95, a UN reception processing unit 96, a buffer memory 97, a PON transmission processing unit 98, and a control unit 99.

The optical transceiver 101 is, for example, removable from the ONU 202. The optical transceiver 101 receives a downstream optical signal which is transmitted from the optical line terminal 201, converts the downstream optical signal into an electrical signal, and outputs the electrical signal.

The PON reception processing unit 92 reconstructs frames from the electrical signal received from the optical transceiver 101, and sorts the frames into the control unit 99 or the UN transmission processing unit 94, according to the types of the frames. Specifically, the PON reception processing unit 92 outputs a data frame to the UN transmission processing unit 94 via the buffer memory 93, and outputs a control frame to the control unit 99.

The control unit 99 generates a control frame including various types of control information and outputs the control frame to the UN transmission processing unit 94.

The UN transmission processing unit 94 transmits the data frame received from the PON reception processing unit 92 and the control frame received from the control unit 99, to a user terminal such as a personal computer which is not shown, via the UNI port 95.

The UN reception processing unit 96 outputs a data frame which is received from the user terminal via the UNI port 95, to the PON transmission processing unit 98 via the buffer memory 97 and outputs a control frame which is received from the user terminal via the UNI port 95, to the control unit 99.

The control unit 99 performs an optical network unit's process related to the control and management of a PON line between the optical line terminal 201 and the ONU 202, such as MPCP and OAM. Namely, the control unit 99 performs various types of control such as access control by exchanging MPCP messages and OAM messages with the optical line terminal 201 connected to the PON line. The control unit 99 generates a control frame including various types of control information and outputs the control frame to the PON transmission processing unit 98. In addition, the control unit 99 performs various types of setting processes for each unit in the ONU 202.

The PON transmission processing unit 98 outputs the data frame received from the UN reception processing unit 96 and the control frame received from the control unit 99, to the optical transceiver 101.

The optical transceiver 101 converts the data frame and the control frame which are an electrical signal received from the PON transmission processing unit 98 into an optical signal, and transmits the optical signal to the optical line terminal 201.

Figure 3:
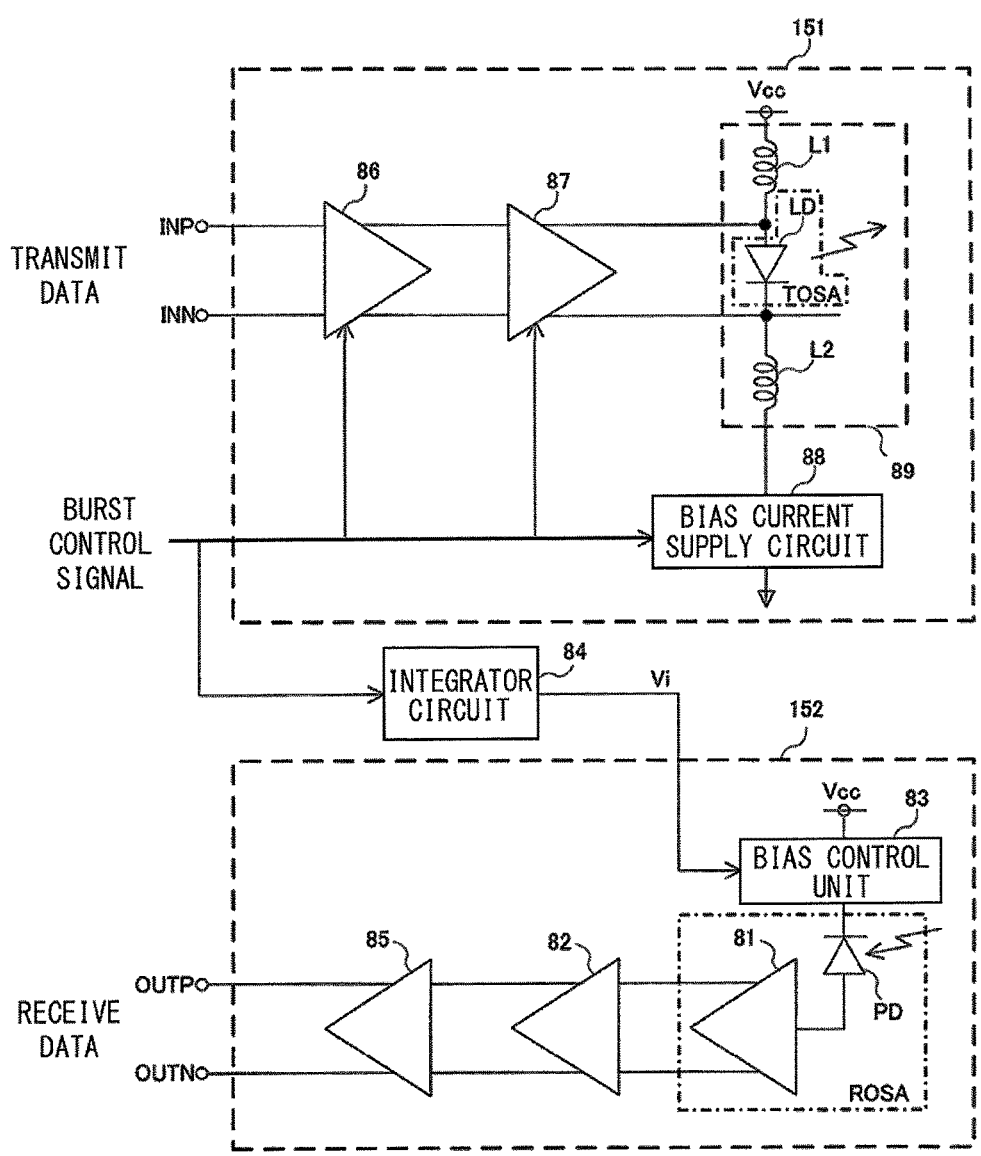
FIG. 3 is a diagram showing a configuration of an optical transceiver in the ONU according to the first embodiment of the present invention.

FIG. 3 is a diagram showing a configuration of the optical transceiver in the ONU according to the first embodiment of the present invention.

Referring to FIG. 3, the optical transceiver 101 includes a burst transmitting unit 151, a receiving unit 152, and an integrator circuit (computing unit) 84. The burst transmitting unit 151 includes a pre-amplifier 86, an output buffer circuit (modulation current supply circuit) 87, a bias current supply circuit 88, and a light emitting circuit 89. The light emitting circuit 89 includes a light emitting element LD and inductors L1 and L2. The receiving unit 152 includes a light receiving element PD, a TIA (transimpedance amplifier) 81, an LIA (limiting amplifier) 82, a bias control unit (adjusting unit) 83, and an output buffer 85.

In the burst transmitting unit 151, the pre-amplifier 86 receives transmit data which is a data frame from the UN reception processing unit 96 and a control frame from the control unit 99, amplifies the transmit data, and outputs the amplified transmit data. For example, the pre-amplifier 86 receives the transmit data as differential signals through signal lines INP and INN.

The output buffer circuit 87 supplies a modulation current to the light emitting circuit 89, based on the transmit data received from the pre-amplifier 86. The modulation current is a current with a magnitude determined according to the logical value of data to be transmitted to the optical line terminal 201.

The light emitting circuit 89 transmits an upstream optical signal to the optical line terminal 201. In the light emitting circuit 89, the light emitting element LD is connected, through the inductor L1, to a power supply node to which a fixed voltage, e.g., a power supply voltage Vcc, is supplied, and is connected to the bias current supply circuit 88 through the inductor L2. The light emitting element LD emits light and changes light emission intensity, based on a bias current supplied from the bias current supply circuit 88 and the modulation current supplied from the output buffer circuit 87.

The burst transmitting unit 151 switches whether to supply power to the pre-amplifier 86 and the output buffer circuit 87, based on a burst control signal received from the control unit 99. Specifically, when the burst control signal is activated, power supply to the pre-amplifier 86 and the output buffer circuit 87 is performed, and when the burst control signal is deactivated, the power supply is stopped.

The bias current supply circuit 88 starts supply of a bias current when a burst control signal for transmitting a burst optical signal is activated. Namely, the bias current supply circuit 88 switches whether to supply a bias current to the light emitting circuit 89, based on the burst control signal received from the control unit 99. Here, in the optical transceiver 101, for example, the value of the bias current is set such that the light emitting element LD emits light when the bias current is applied to the light emitting element LD in a state in which the magnitude of a modulation current supplied to the light emitting element LD is zero.

The integrator circuit 84 calculates a burst duty ratio of a burst optical signal. Specifically, the integrator circuit 84, for example, integrates a burst control signal received from the control unit 99, and outputs a voltage Vi having a level according to an integral value to the bias control unit 83.

In the receiving unit 152, the light receiving element PD is, for example, an avalanche photodiode. The light receiving element PD converts an optical signal received from the optical line terminal 201 into an electrical signal, e.g., a current, and outputs the current.

The TIA 81 converts the current received from the light receiving element PD into a voltage and outputs the voltage to the LIA 82.

The LIA 82 converts the level of the voltage received from the TIA 81 into a binary value and outputs the binary value as receive data.

The output buffer 85 amplifies the receive data received from the LIA 82 and outputs the amplified receive data to the PON reception processing unit 92. For example, the output buffer 85 outputs the receive data as differential signals through signal lines OUTP and OUTN.

The bias control unit 83 includes, for example, a processor that performs logical operation processing, such as a CPU (Central Processing Unit), an MPU (Micro-Processing Unit), or an FPGA (Field-Programmable Gate Array).

The bias control unit 83 is connected to a power supply node to which a fixed voltage, e.g., a power supply voltage Vcc, is supplied, and supplies a bias voltage to the light receiving element PD. The bias control unit 83 has the function of adjusting the bias voltage.

In addition, for example, the light emitting element LD is included in an assembled light emitting module (hereinafter, also referred to as TOSA: Transmitter Optical Sub-Assembly). In addition, for example, the light receiving element PD and the TIA 81 are included in an assembled light receiving module (hereinafter, also referred to as ROSA: Receiver Optical Sub-Assembly).

Figure 4:
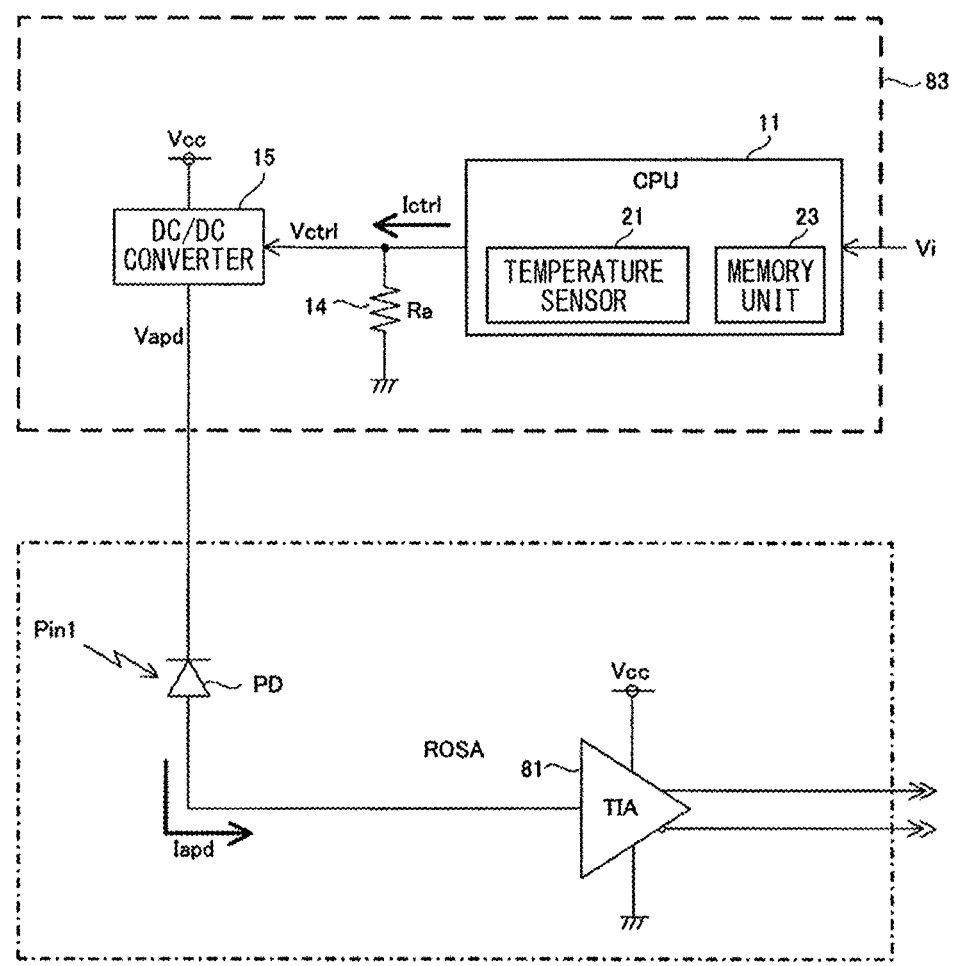
FIG. 4 is a diagram showing a configuration of a bias control unit in the optical transceiver according to the first embodiment of the present invention.

FIG. 4 is a diagram showing a configuration of the bias control unit in the optical transceiver according to the first embodiment of the present invention.

Referring to FIG. 4, the bias control unit 83 includes a CPU 11, a resistor 14, and a DC/DC converter 15. The CPU 11 includes a temperature sensor 21 and a memory unit 23. The resistance value of the resistor 14 is Ra.

The light receiving element PD has a cathode connected to the DC/DC converter 15 and an anode connected to an input terminal of the TIA 81. The resistor 14 has a first terminal connected to an output terminal of the CPU 11 and an input terminal of the DC/DC converter 15; and a second terminal connected to a ground node. A power supply voltage Vcc is supplied to the DC/DC converter 15 and the TIA 81.

The light receiving element PD outputs a current Iapd generated according to the strength of an optical signal Pin1 which is received from the optical line terminal 201 via the optical fiber OPTF, to the TIA 81. In addition, the light receiving element PD can change a multiplication factor M by a reverse bias voltage Vapd.

The CPU 11 adjusts the reverse bias voltage Vapd applied to the light receiving element PD. The CPU 11 can perform a computation process using a temperature detected by the temperature sensor 21, as will be described later.

The DC/DC converter 15 supplies the reverse bias voltage Vapd to the light receiving element PD, according to the adjustment of the reverse bias voltage Vapd performed by the CPU 11.

More specifically, the CPU 11 generates and outputs a current Ictrl. The current Ictrl is converted into a voltage Vctrl by the resistor 14, and the voltage Vctrl is supplied to the DC/DC converter 15.

The DC/DC converter 15 supplies a reverse bias voltage Vapd to the light receiving element PD, based on the voltage Vctrl received from the CPU 11.

Specifically, the reverse bias voltage Vapd is represented by the following equation (B1), using coefficients K1 and K2 which are determined by the circuit configuration of the DC/DC converter 15 and the voltage Vctrl:

$$Vapd = K1 \times Vctrl + K2 \tag{B1}$$

In addition, when the resistance value of the resistor 14 is Ra, the voltage Vctrl is represented by the following equation (B2), using the output current Ictrl from the CPU 11:

$$Vctrl = Ictrl \times Ra \tag{B2}$$

It can be seen from equation (B1) and equation (B2) that the reverse bias voltage Vapd applied to the light receiving element PD is changed by the output current Ictrl from the CPU 11.

For example, the CPU 11 converts, by a D/A converter included therein, a control digital value into a current Ictrl. By thus using the component included in the CPU 11, the number of components in the optical transceiver 101 can be reduced. In this case, the relationship between the control digital value provided to the D/A converter and the reverse bias voltage Vapd is a linear relationship.

In addition, when the multiplication factor of the light receiving element PD is M, the light receiving sensitivity of the light receiving element PD is RS1 [A/W], and the light receiving intensity of the light receiving element PD is Pin1 [W], the output current Iapd [A] from the light receiving element PD is represented by the following equation (C1):

$$Iapd = M \times RS1 \times Pin1 \tag{C1}$$

Figure 5:
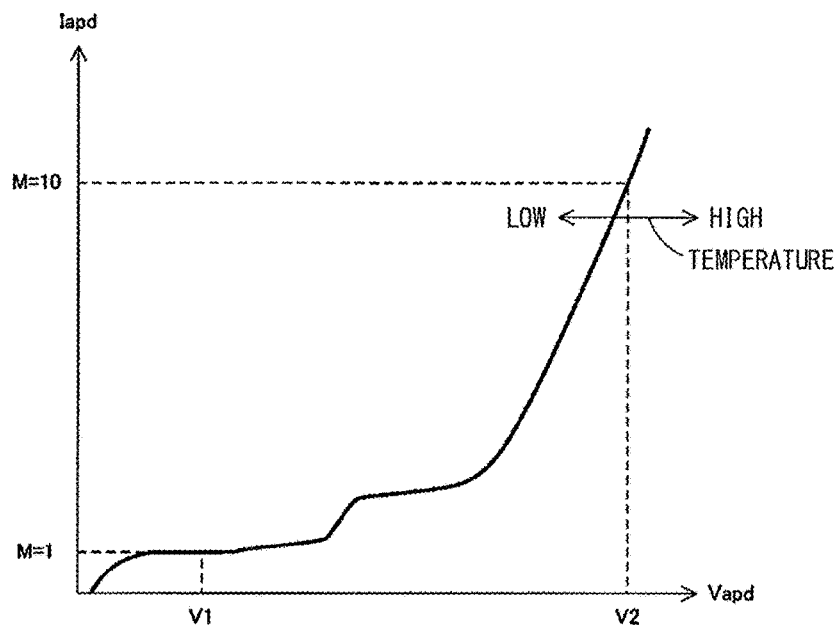
FIG. 5 is a diagram showing an example of a current multiplication characteristic of a light receiving element in the optical transceiver according to the first embodiment of the present invention.

FIG. 5 is a diagram showing an example of a current multiplication characteristic of the light receiving element in the optical transceiver according to the first embodiment of the present invention. In FIG. 5, a horizontal axis is the reverse bias voltage Vapd and a vertical axis is the output current Iapd.

Referring to FIG. 5, the output current Iapd increases as the reverse bias voltage Vapd applied to the light receiving element PD increases. Namely, the multiplication factor M increases.

More specifically, when the reverse bias voltage Vapd is small, even if the reverse bias voltage Vapd is changed in a certain range, avalanche multiplication does not occur, and thus, the multiplication factor M of the light receiving element PD is constant. The multiplication factor M at this time is 1.

Then, when the reverse bias voltage Vapd rises from V1 included in the above-described range to V2, the output current Iapd is 10× larger than that for when the reverse bias voltage Vapd is V1. Namely, when the reverse bias voltage Vapd is V2, the multiplication factor M is 10.

In addition, the multiplication factor M of the light receiving element PD has strong temperature characteristics. As shown in FIG. 5, the output current Iapd decreases when the temperature of the light receiving element PD rises, and the output current Iapd increases when the temperature of the light receiving element PD falls. Namely, when the temperature of the light receiving element PD rises, the multiplication factor M for the reverse bias voltage Vapd decreases, and when the temperature of the light receiving element PD falls, the multiplication factor M for the reverse bias voltage Vapd increases.

Figure 6:
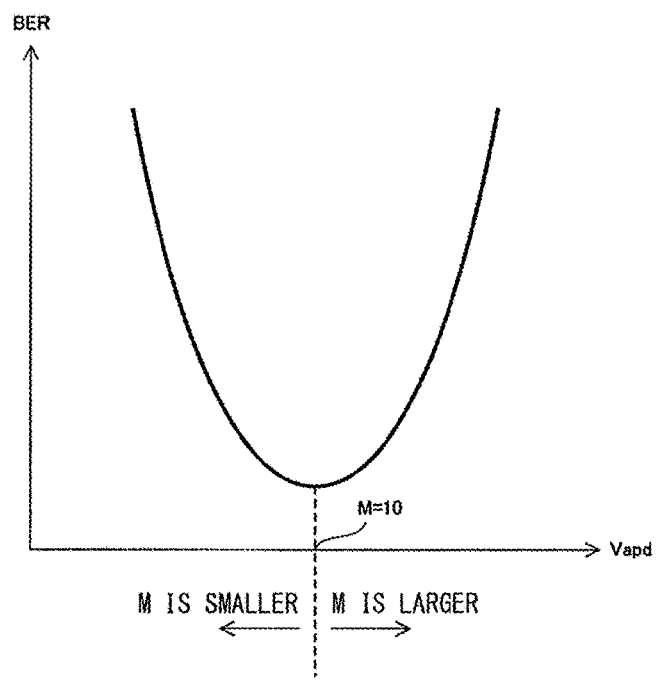
FIG. 6 is a diagram showing an example of a relationship between a reverse bias voltage applied to the light receiving element in the optical transceiver and communication quality, according to the first embodiment of the present invention.

FIG. 6 is a diagram showing an example of a relationship between the reverse bias voltage applied to the light receiving element in the optical transceiver and communication quality, according to the first embodiment of the present invention. In FIG. 6, a horizontal axis is the reverse bias voltage Vapd and a vertical axis is bit error rate.

Referring to FIG. 6, when the multiplication factor M is increased by increasing the reverse bias voltage Vapd from a state in which the reverse bias voltage Vapd is set to obtain a multiplication factor M of 10, the frequency band of the light receiving element PD decreases and noise increases, by which the S/N ratio (Signal to Noise Ratio) degrades and accordingly the bit error rate increases.

On the other hand, when the multiplication factor M is reduced by reducing the reverse bias voltage Vapd from a state in which the reverse bias voltage Vapd is set to obtain a multiplication factor M of 10, the light receiving sensitivity of the light receiving element PD decreases and it becomes difficult to receive an optical signal with a lower strength. Thus, the S/N ratio (Signal to Noise Ratio) degrades and accordingly the bit error rate increases.

As such, the multiplication factor M has an optimal value; for example, the optimal value is around 10. In addition, as described in FIG. 5, the multiplication factor M has temperature characteristics, and thus, there is a need to adjust the multiplication factor M according to the temperature of the light receiving element PD, to maintain the optimal value.

Referring back to FIG. 4, in the optical transceiver 101, the CPU 11 in the bias control unit 83 therefore adjusts the output current Ictrl such that the multiplication factor M has a target value.

Figure 7:
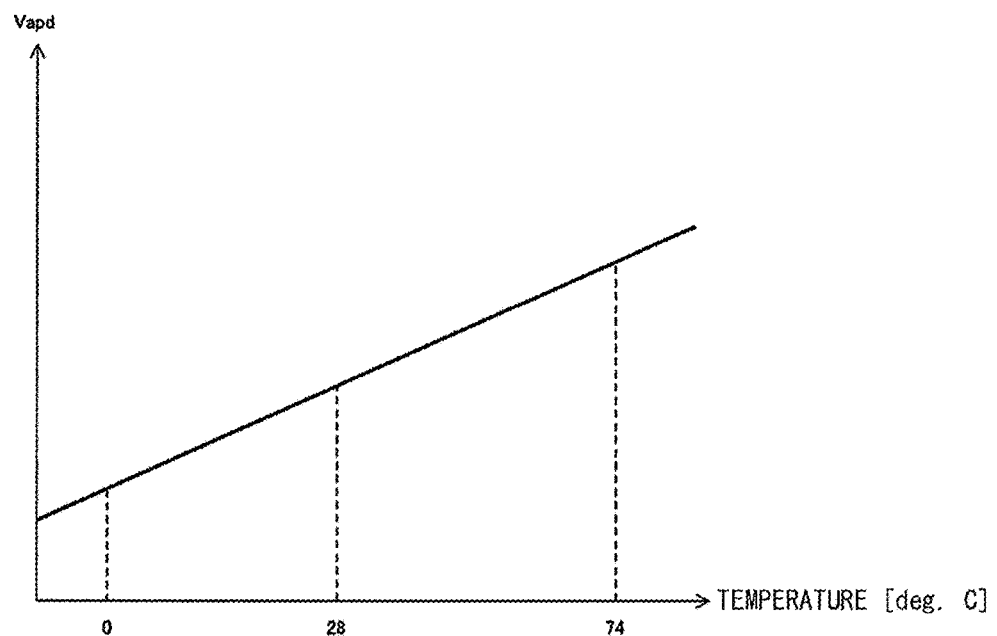
FIG. 7 is a diagram showing an example of a method of adjusting the reverse bias voltage applied to the light receiving element in the optical transceiver according to the first embodiment of the present invention.

FIG. 7 is a diagram showing an example of a method of adjusting the reverse bias voltage applied to the light receiving element in the optical transceiver according to the first embodiment of the present invention. In FIG. 7, a horizontal axis is a temperature detected by the temperature sensor 21, and a vertical axis is the reverse bias voltage Vapd.

For example, a reverse bias voltage Vapd at which the multiplication factor M obtains the optimal value is measured at three temperatures, low, normal, and high temperatures, specifically, 0° C., 28° C., and 74° C. Here, for example, the measurement is performed in a transmission on state of an optical signal by the light emitting element LD, specifically, a state in which a burst control signal is activated and the light emitting element LD is emitting light based on a bias current and a modulation current. Note that the optical transceiver 101 may be configured such that the light emitting element LD does not emit light in a state in which a bias current is being supplied to the light emitting element LD. In this case, the transmission on state and transmission off state of the optical signal correspond to the on state and off state of the light emitting element LD, respectively.

Here, the fact that, for example, in an avalanche photodiode, a relationship between the temperature of the light receiving element PD and the reverse bias voltage Vapd can be approximated by a straight line for certain multiplication factors M is obtained by an experimental rule.

Using this fact, measured temperatures are interpolated by straight lines, by which a lookup table representing a linear relationship such as that shown in FIG. 7 is created, and the reverse bias voltage Vapd is controlled using the lookup table.

Specifically, a lookup table that represents a correspondence relationship between the temperature detected by the temperature sensor 21 and the control digital value of the D/A converter included in the CPU 11 in, for example, 2° C. steps is created, and the lookup table is saved in the memory unit 23 in the optical transceiver 101.

Then, the CPU 11 obtains, from the lookup table, a control digital value appropriate to a temperature detected by the temperature sensor 21 and provides the control digital value to the D/A converter.

By this, feedforward control of the multiplication factor M of the light receiving element PD can be performed.

Figure 8:
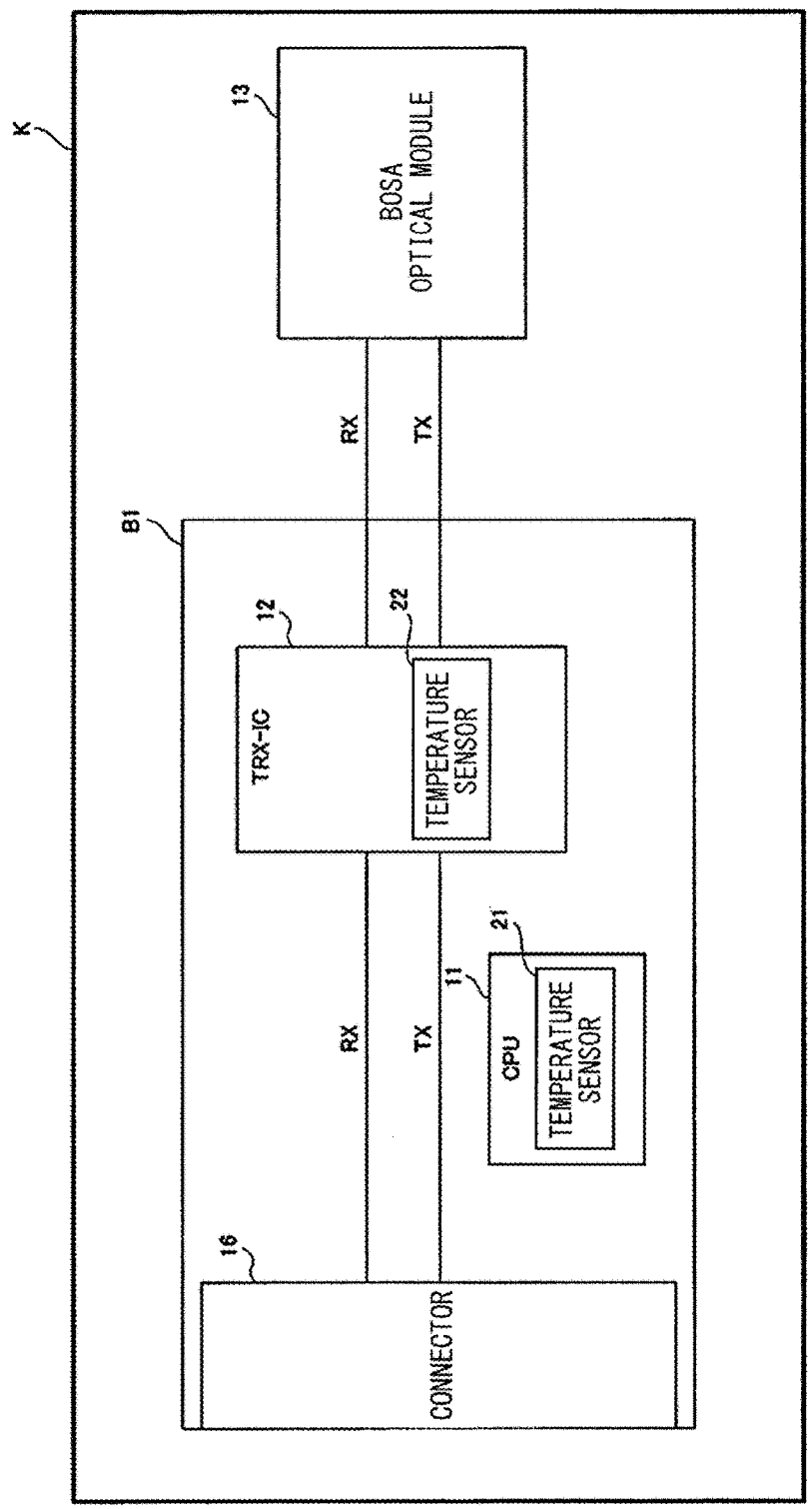
FIG. 8 is a diagram schematically showing an example of the disposition of each component in the optical transceiver according to the first embodiment of the present invention.

FIG. 8 is a diagram schematically showing an example of the disposition of each component in the optical transceiver according to the first embodiment of the present invention.

Referring to FIG. 8, the optical transceiver 101 includes a casing K, a sub-substrate B1, and a BOSA (Bidirectional Optical Sub-Assemblies) optical module 13.

In the optical transceiver 101, for example, each unit shown in FIG. 2 is mounted on a main substrate which is not shown. In addition, the sub-substrate B1 is connected to the main substrate through a connector 16.

On the sub-substrate B1 are mounted the CPU 11 which is an integrated circuit, a TRX-IC (Integrated Circuit) 12 which is an integrated circuit, and the connector 16.

Main signals, control signals, and the like, which are sent and received between the main substrate and the sub-substrate B1 are transmitted through the connector 16. In addition, FIG. 8 representatively shows main-signal lines (TX) on the transmitting side and main-signal lines (RX) on the receiving side.

The TRX-IC 12 includes, for example, the pre-amplifier 86, the output buffer circuit 87, the bias current supply circuit 88, the LIA 82, and the output buffer 85. In addition, the TRX-IC 12 includes, for example, a temperature sensor 22.

The BOSA optical module 13 is an optical module where a TOSA which is a light emitting unit and a ROSA which is a light receiving unit are integrated. The TOSA portion of the BOSA optical module 13 is hereinafter also simply referred to as TOSA, and the ROSA portion of the BOSA optical module 13 is hereinafter also simply referred to as ROSA.

The casing K is mounted on the main substrate, and accommodates the sub-substrate B1 and the BOSA optical module 13. The casing K has a long and narrow shape. The TRX-IC 12 is disposed between the temperature sensor 21 and the BOSA optical module 13. More specifically, in the casing K, the connector 16, the CPU 11, the TRX-IC 12, and the BOSA optical module 13 are disposed side by side in this order, and this arrangement direction is along a longitudinal direction of the casing K. In addition, for example, the distance between the CPU 11 and the TRX-IC 12 is less than the distance between the BOSA optical module 13 and the TRX-IC 12.

The casing K has thermal conductivity and is formed of, for example, metal. Namely, each member is covered by a thermal conductive member so that the ambient temperature of the casing K uniformly affects each member accommodated in the casing K.

Here, the power consumption of the TRX-IC 12 is higher than that of the CPU 11 and the BOSA optical module 13. More specifically, of the circuits on the transmitting side which are accommodated in the casing K, a transmission driver DV that drives the light emitting element LD and that is included in the TRX-IC 12 has the highest power consumption.

Due to this, the internal temperature of the casing K greatly changes between the transmission on state and transmission off state of an optical signal.

For example, in the casing K, since the CPU 11 is closer to the TRX-IC 12 than the BOSA optical module 13 is, a change in temperature detected by the temperature sensor 21 in the CPU 11 is larger than a change in the ambient temperature of the light receiving element PD in the BOSA optical module 13.

Here, the transmission driver DV corresponds to at least one of the pre-amplifier 86, the output buffer circuit 87, and the bias current supply circuit 88. The temperature sensor 22 is thermally coupled to the transmission driver DV.

In a configuration using a lookup table representing a correspondence relationship between the temperature detected by the temperature sensor 21 and the reverse bias voltage Vapd for a transmission on state of an optical signal such as that described above, the power consumption of the transmission driver DV decreases in a transmission off state of the optical signal, i.e., a state in which a burst control signal is deactivated, and the internal temperature of the casing K also decreases, and thus, a temperature relationship on which the lookup table is premised is destroyed. Namely, it becomes difficult to favorably adjust the reverse bias voltage Vapd according to the temperature.

Particularly, in the ONU 202 that transmits a burst-like optical signal, the relationship in the lookup table is destroyed by the burst duty ratio, i.e., burst-on ratio.

Note that a method in which a temperature sensor is mounted on the BOSA optical module 13 may also be considered; however, there is a need to newly provide, on the BOSA optical module 13, a terminal for connecting the temperature sensor to the sub-substrate B1, and if such a temperature sensor and a terminal are implemented, then it becomes difficult to miniaturize the BOSA optical module 13. Therefore, normally, it is easier and desirable to use a temperature sensor included in the CPU 11, etc., provided on the sub-substrate B1.

The inventor of the present application has found such a problem and examined the problem. The content of the examination of the problem performed by the inventor of the present application will be described in detail below.

In the present examination, as an example, an optical transceiver 101 is used in which a TOSA is provided with a heat dissipation sheet and a ROSA, a CPU 11, and a TRX-IC 12 are not provided with a heat dissipation sheet.

Figure 9:
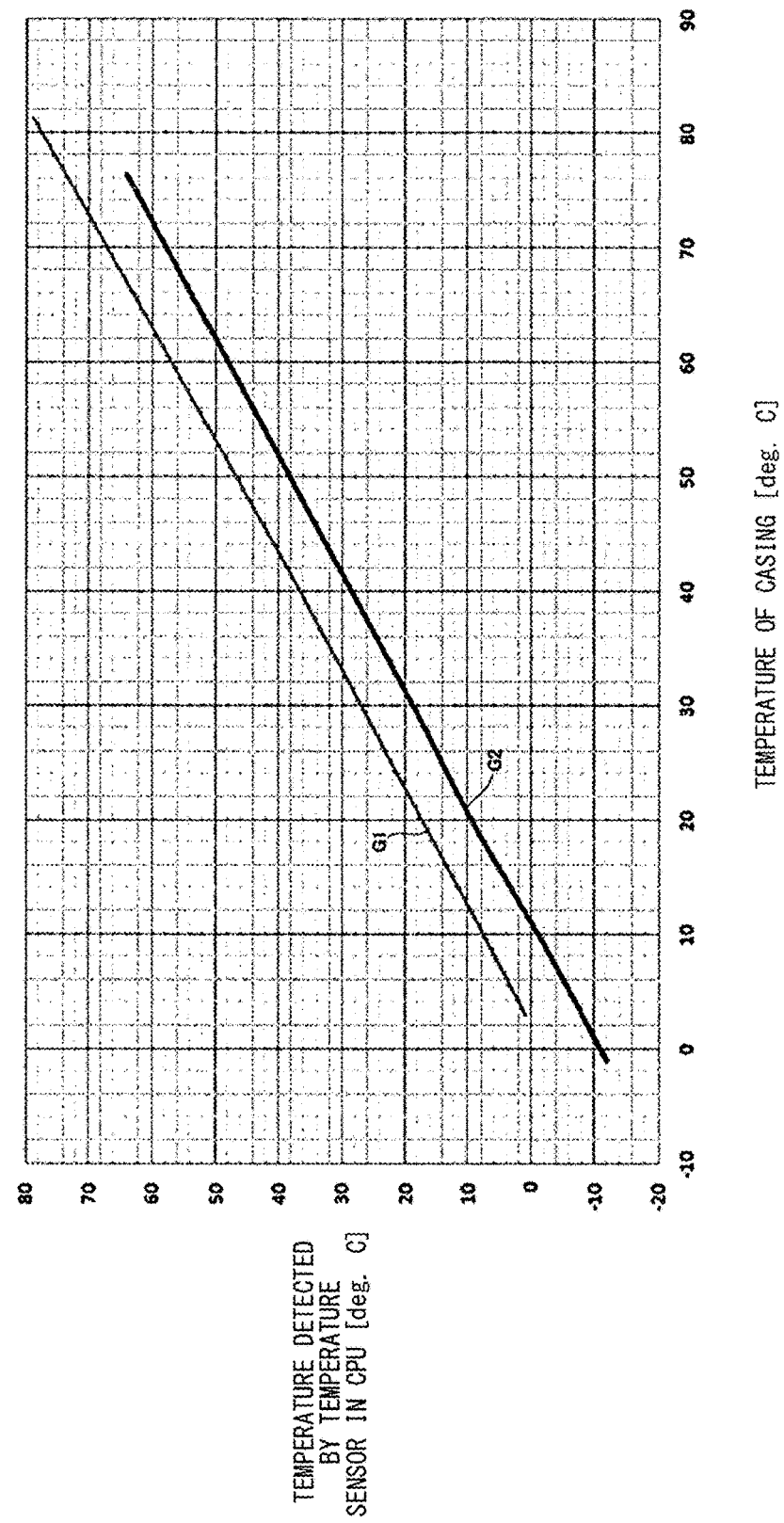
FIG. 9 is a diagram showing the measurement results of a relationship between the temperature of a casing and the temperature detected by a temperature sensor in a CPU in the optical transceiver according to the first embodiment of the present invention.

FIG. 9 is a diagram showing the measurement results of a relationship between the temperature of the casing and the temperature detected by the temperature sensor in the CPU in the optical transceiver according to the first embodiment of the present invention. In FIG. 9, a horizontal axis is the temperature of the casing, and a vertical axis is the temperature detected by the temperature sensor 21 in the CPU 11. A graph G1 represents a transmission on state and a graph G2 represents a transmission off state. Here, the temperature of the casing K is a temperature at a location near the TOSA.

Referring to FIG. 9, the temperature sensor 21 is used to indicate the temperature of the casing K. More specifically, a temperature detected by the temperature sensor 21 is calculated by substituting a digital value to which an output signal from the temperature sensor 21 is converted by an A/D converter, into a predetermined conversion formula. A coefficient in the conversion formula is calculated using digital values of the A/D converter for a low temperature and a high temperature in a transmission on state of an optical signal.

It can be seen from the graphs G1 and G2 that in the transmission off state, the conversion formula adjusted for the transmission on state does not hold and the detected temperatures are shifted relative to those for the transmission on state by about 10° C. toward lower temperatures.

Figure 10:
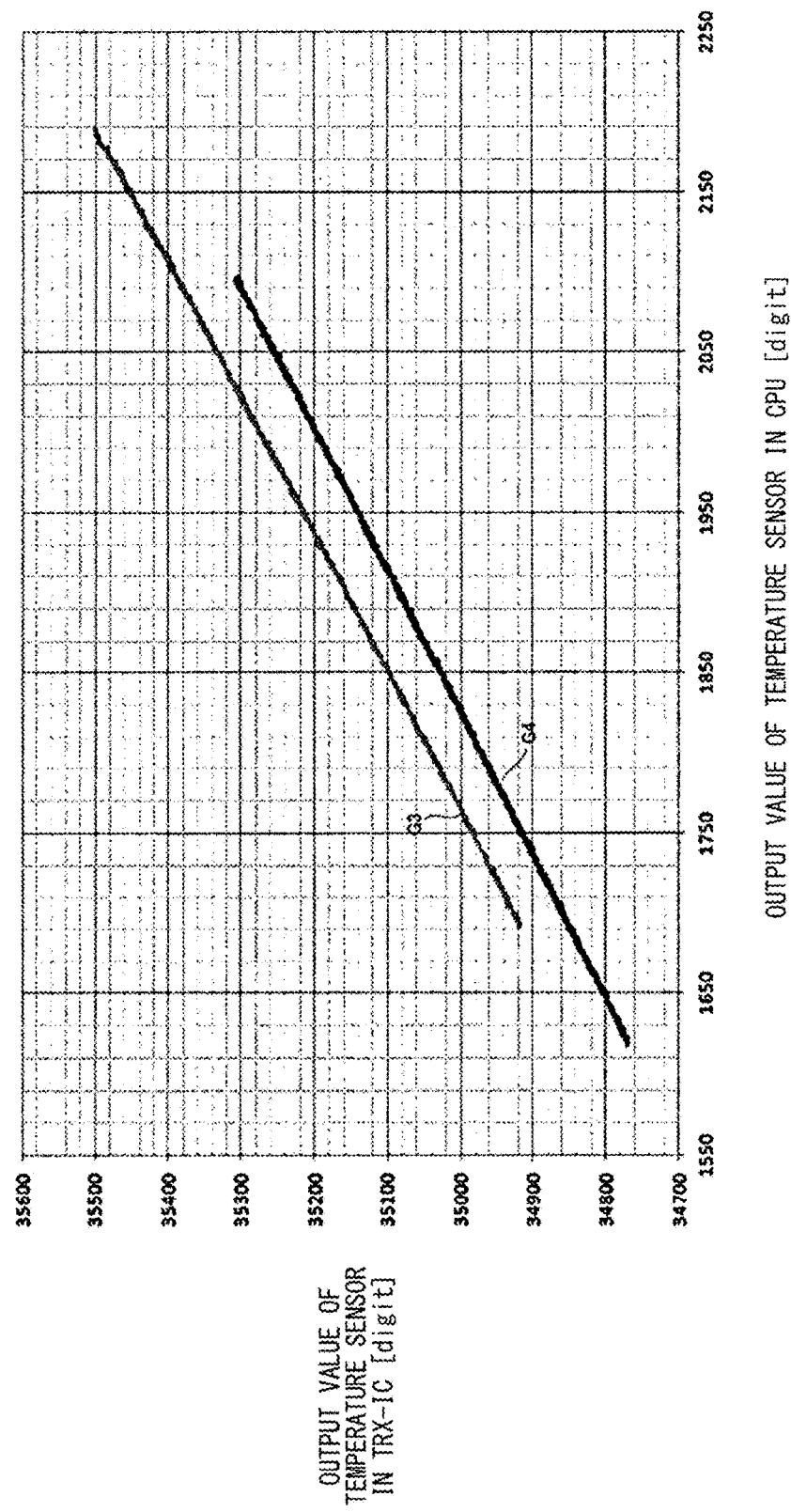
FIG. 10 is a diagram showing the measurement results of a relationship between the output values of two temperature sensors in the optical transceiver according to the first embodiment of the present invention.

FIG. 10 is a diagram showing the measurement results of a relationship between the output values of two temperature sensors in the optical transceiver according to the first embodiment of the present invention. In FIG. 10, a horizontal axis is an output digital value of the temperature sensor 21 in the CPU 11, and a vertical axis is an output digital value of the temperature sensor 22 in the TRX-IC 12. A graph G3 represents a transmission on state and a graph G4 represents a transmission off state.

Referring to FIG. 10, it can be seen that in both of the transmission on state and the transmission off state, there is a correlation between the output value of the temperature sensor 21 and the output value of the temperature sensor 22. In addition, it can be seen that, as in FIG. 9, the transmission on state and the transmission off state are shifted relative to each other.

Figure 11:
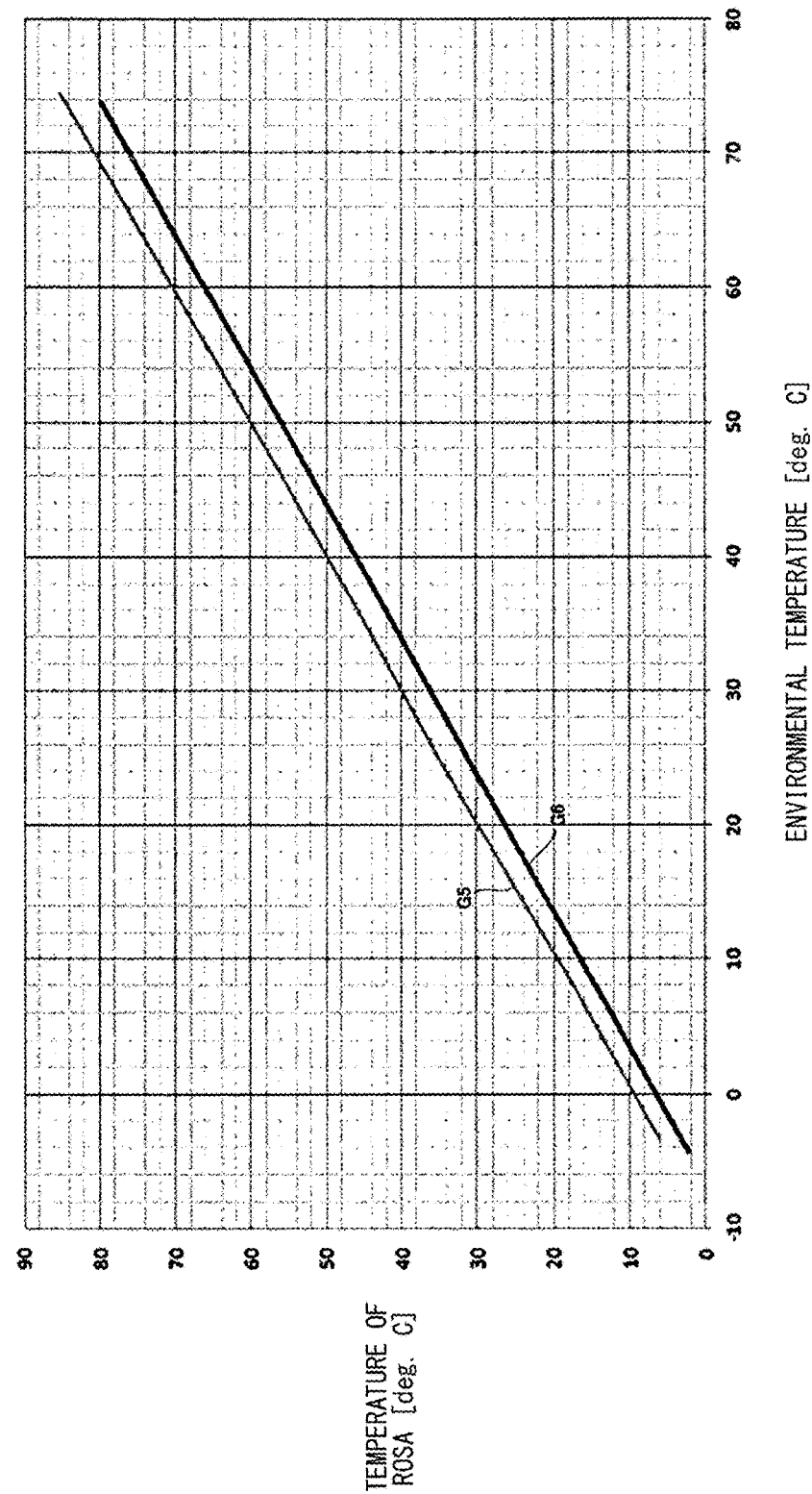
FIG. 11 is a diagram showing the measurement results of a relationship between environmental temperature and the temperature of a ROSA in the optical transceiver according to the first embodiment of the present invention.

FIG. 11 is a diagram showing the measurement results of a relationship between environmental temperature and the temperature of the ROSA in the optical transceiver according to the first embodiment of the present invention. In FIG. 11, a horizontal axis is the environmental temperature and a vertical axis is the temperature of the ROSA. A graph G5 represents a transmission on state and a graph G6 represents a transmission off state.

Referring to FIG. 11, it can be seen from the graphs G5 and G6 that in the transmission off state, the measured temperatures are shifted relative to those for the transmission on state by about 3° C. to 4° C. toward lower temperatures. In addition, it can be seen that the shift is larger at high temperatures than at low temperatures.

Figure 12:
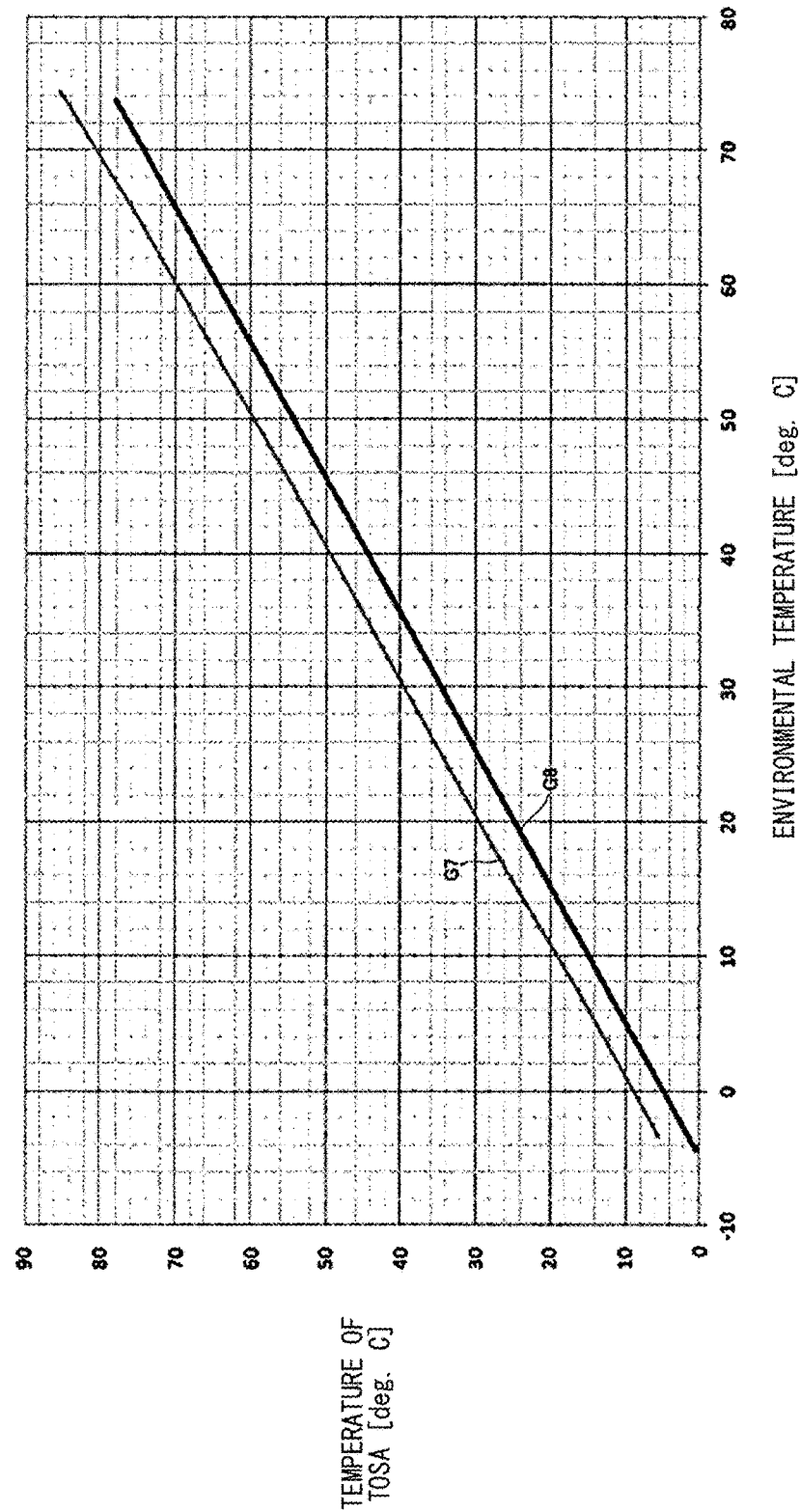
FIG. 12 is a diagram showing the measurement results of a relationship between environmental temperature and the temperature of a TOSA in the optical transceiver according to the first embodiment of the present invention.

FIG. 12 is a diagram showing the measurement results of a relationship between environmental temperature and the temperature of the TOSA in the optical transceiver according to the first embodiment of the present invention. In FIG. 12, a horizontal axis is the environmental temperature and a vertical axis is the temperature of the TOSA. A graph G7 represents a transmission on state and a graph G8 represents a transmission off state.

Referring to FIG. 12, it can be seen from the graphs G7 and G8 that in the transmission off state, the measured temperatures are shifted relative to those for the transmission on state by about 4° C. to 6° C. toward lower temperatures. In addition, it can be seen that the shift is larger at high temperatures than at low temperatures.

Figure 13:
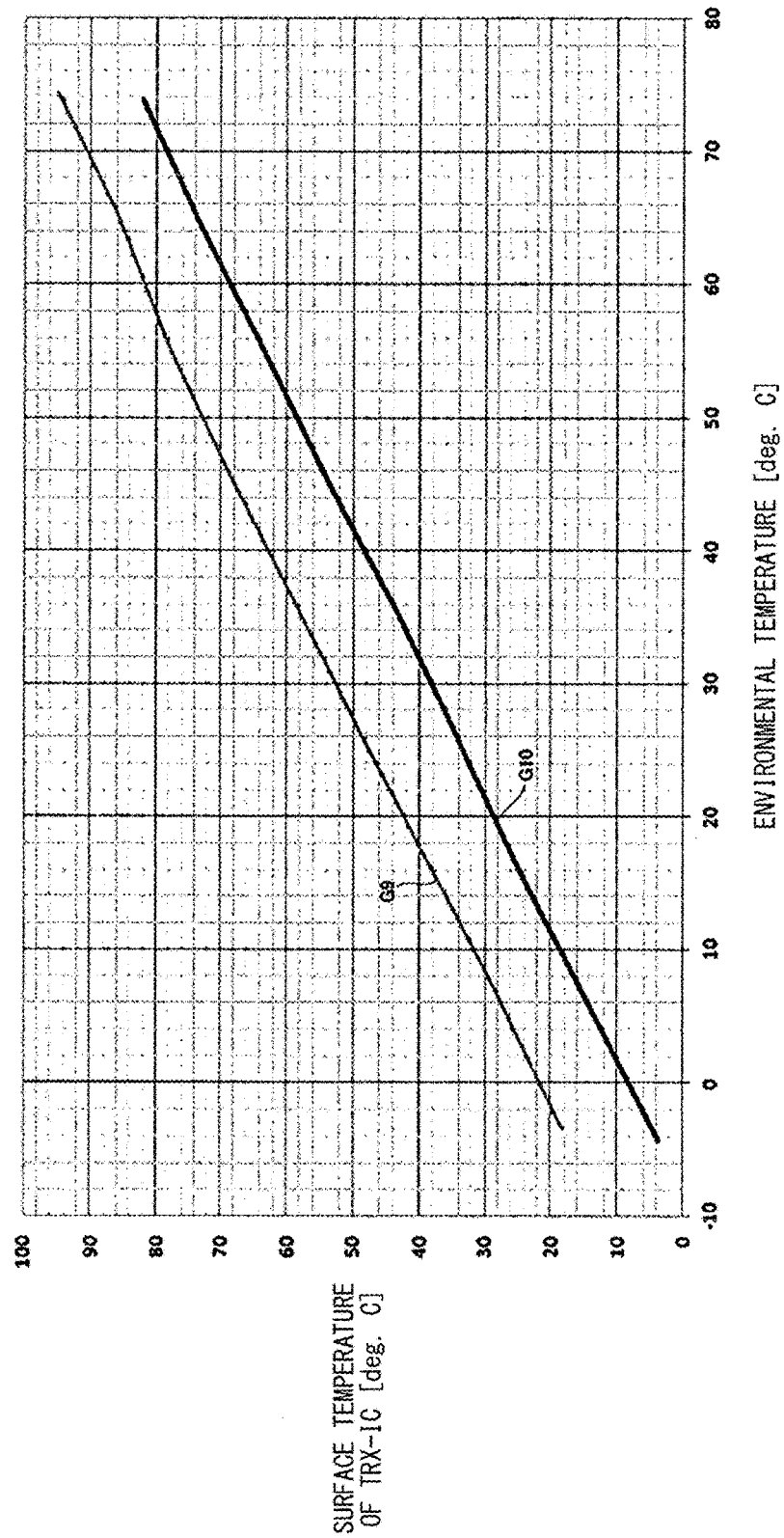
FIG. 13 is a diagram showing the measurement results of a relationship between environmental temperature and the surface temperature of a TRX-IC in the optical transceiver according to the first embodiment of the present invention.

FIG. 13 is a diagram showing the measurement results of a relationship between environmental temperature and the surface temperature of the TRX-IC in the optical transceiver according to the first embodiment of the present invention. In FIG. 13, a horizontal axis is the environmental temperature and a vertical axis is the surface temperature of the TRX-IC 12. A graph G9 represents a transmission on state and a graph G10 represents a transmission off state.

Referring to FIG. 13, it can be seen from the graphs G9 and G10 that in the transmission off state, the measured temperatures are shifted relative to those for the transmission on state by about 14° C. toward lower temperatures. In addition, it can be seen that the shift is substantially constant over a range of low to high temperatures.

Figure 14:
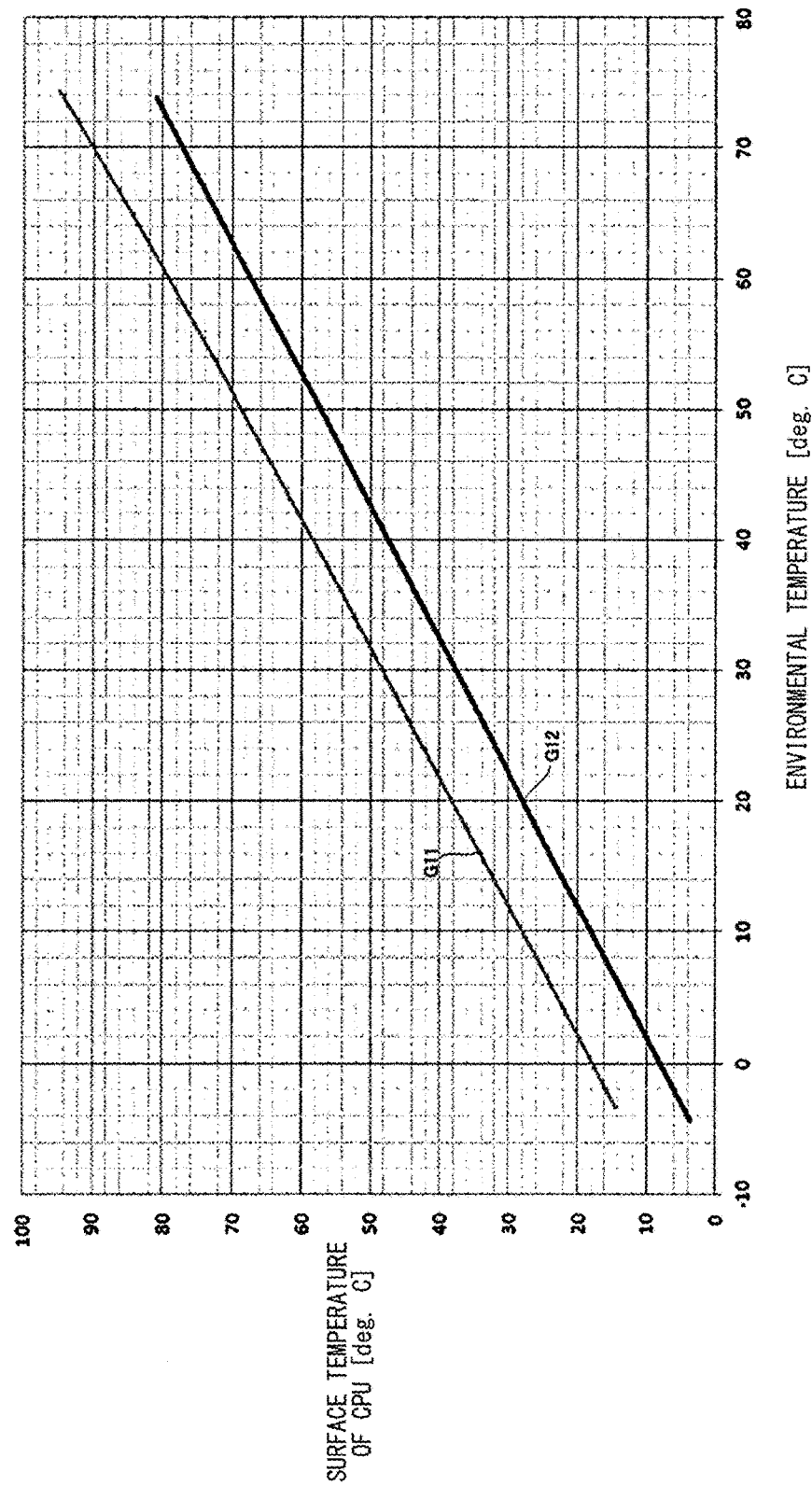
FIG. 14 is a diagram showing the measurement results of a relationship between environmental temperature and the surface temperature of the CPU in the optical transceiver according to the first embodiment of the present invention.

FIG. 14 is a diagram showing the measurement results of a relationship between environmental temperature and the surface temperature of the CPU in the optical transceiver according to the first embodiment of the present invention. In FIG. 14, a horizontal axis is the environmental temperature and a vertical axis is the surface temperature of the CPU 11. A graph G11 represents a transmission on state and a graph G12 represents a transmission off state.

Referring to FIG. 14, it can be seen from the graphs G11 and G12 that in the transmission off state, the measured temperatures are shifted relative to those for the transmission on state by about 10° C. to 12° C. toward lower temperatures. In addition, it can be seen that the shift is larger at high temperatures than at low temperatures.

Figure 15:
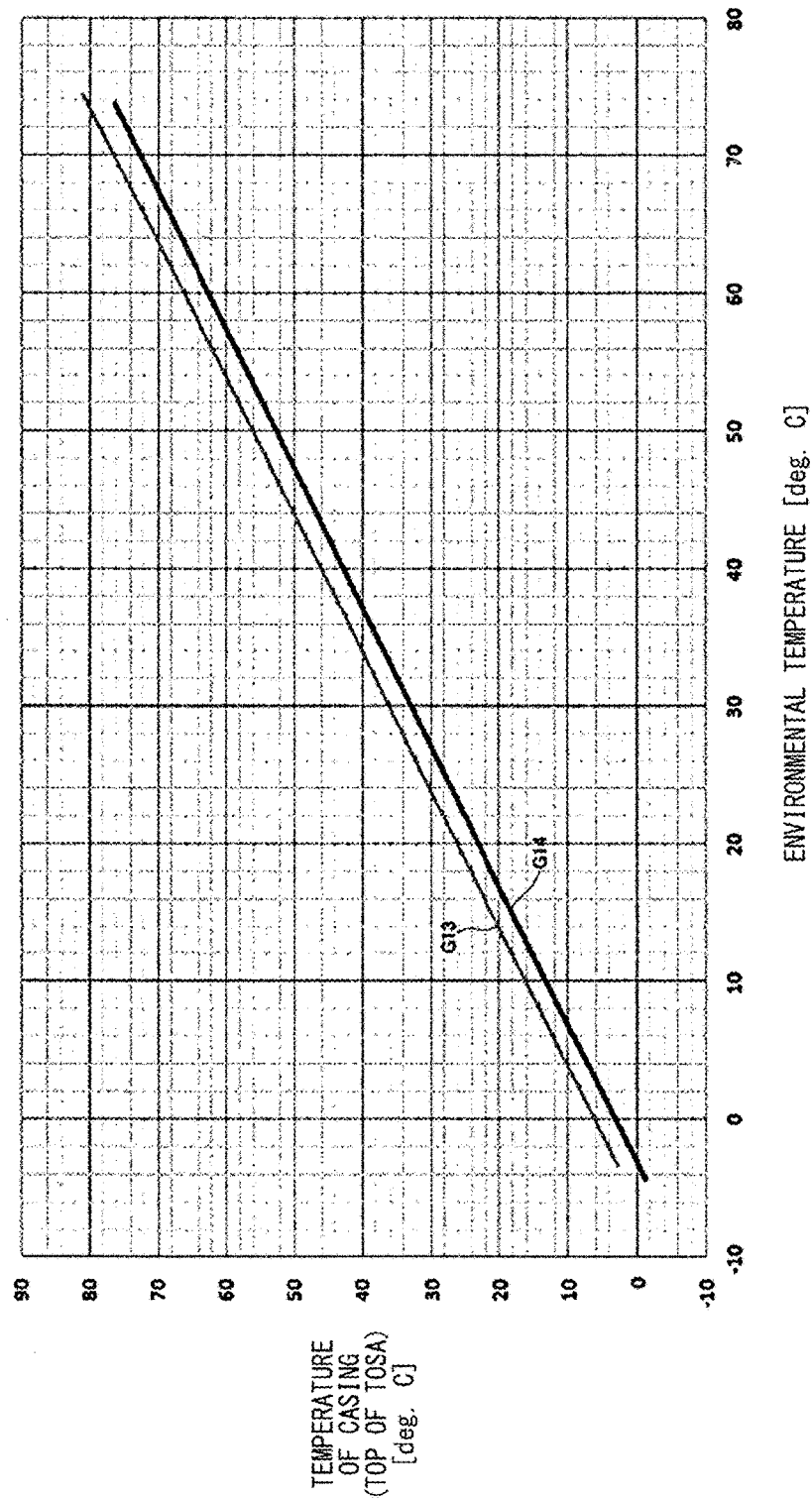
FIG. 15 is a diagram showing the measurement results of a relationship between environmental temperature and the temperature of the casing in the optical transceiver according to the first embodiment of the present invention.

FIG. 15 is a diagram showing the measurement results of a relationship between environmental temperature and the temperature of the casing in the optical transceiver according to the first embodiment of the present invention. In FIG. 15, a horizontal axis is the environmental temperature and a vertical axis is the temperature of the casing. A graph G13 represents a transmission on state and a graph G14 represents a transmission off state. Here, the temperature of the casing K is a temperature at a location near the TOSA.

Referring to FIG. 15, it can be seen from the graphs G13 and G14 that in the transmission off state, the measured temperatures are shifted relative to those for the transmission on state by about 3° C. to 4° C. toward lower temperatures.

It can be seen from FIGS. 13 to 15 that the casing K has a smaller temperature shift between the transmission on state and the transmission off state than the CPU 11 and the TRX-IC 12. Namely, it can be seen that the power consumption of the TOSA itself is relatively low.

From FIGS. 13 to 15, the surface of the TRX-IC 12 has the largest temperature shift between the transmission on state and the transmission off state. This indicates that the power consumption of the TRX-IC 12 is higher than that of other circuits.

From FIGS. 11 and 14, while the ROSA has a small temperature shift between the transmission on state and the transmission off state, the surface of the CPU 11 has a large temperature shift between the transmission on state and the transmission off state. The amount of processing of the CPU 11 essentially does not change greatly between the transmission on state and the transmission off state and thus the difference in the power consumption of the CPU 11 between the transmission on state and the transmission off state is supposed to be small, and the CPU 11 has a lower power consumption than the TRX-IC 12.

The same phenomenon is seen in FIGS. 9 and 15, too. Namely, while the casing K has a small temperature shift between the transmission on state and the transmission off state, the temperature detected by the temperature sensor 21 that is supposed to indicate the temperature of the casing K is greatly shifted.

Namely, it has been verified that in the optical transceiver 101, in a configuration using a lookup table such as that described above, since the temperature relationship on which the lookup table is premised is destroyed, it is difficult to favorably adjust the reverse bias voltage Vapd according to the temperature.

In addition, from FIGS. 12 to 14, while the TOSA has a small temperature shift between the transmission on state and the transmission off state, the surfaces of the CPU 11 and the TRX-IC 12 have a large temperature shift between the transmission on state and the transmission off state.

This is possibly due to the influence of the difference in power consumption, the difference in heat conduction within the casing K, and the like. More specifically, it is considered that the majority of heat directly transmitted to the temperature sensor 21 in the CPU 11 is from the transmission driver DV, and in the casing K heat generation and heat conduction of members other than the transmission driver DV are spread overall, and the environmental temperature uniformly affects each member.

Figure 16:
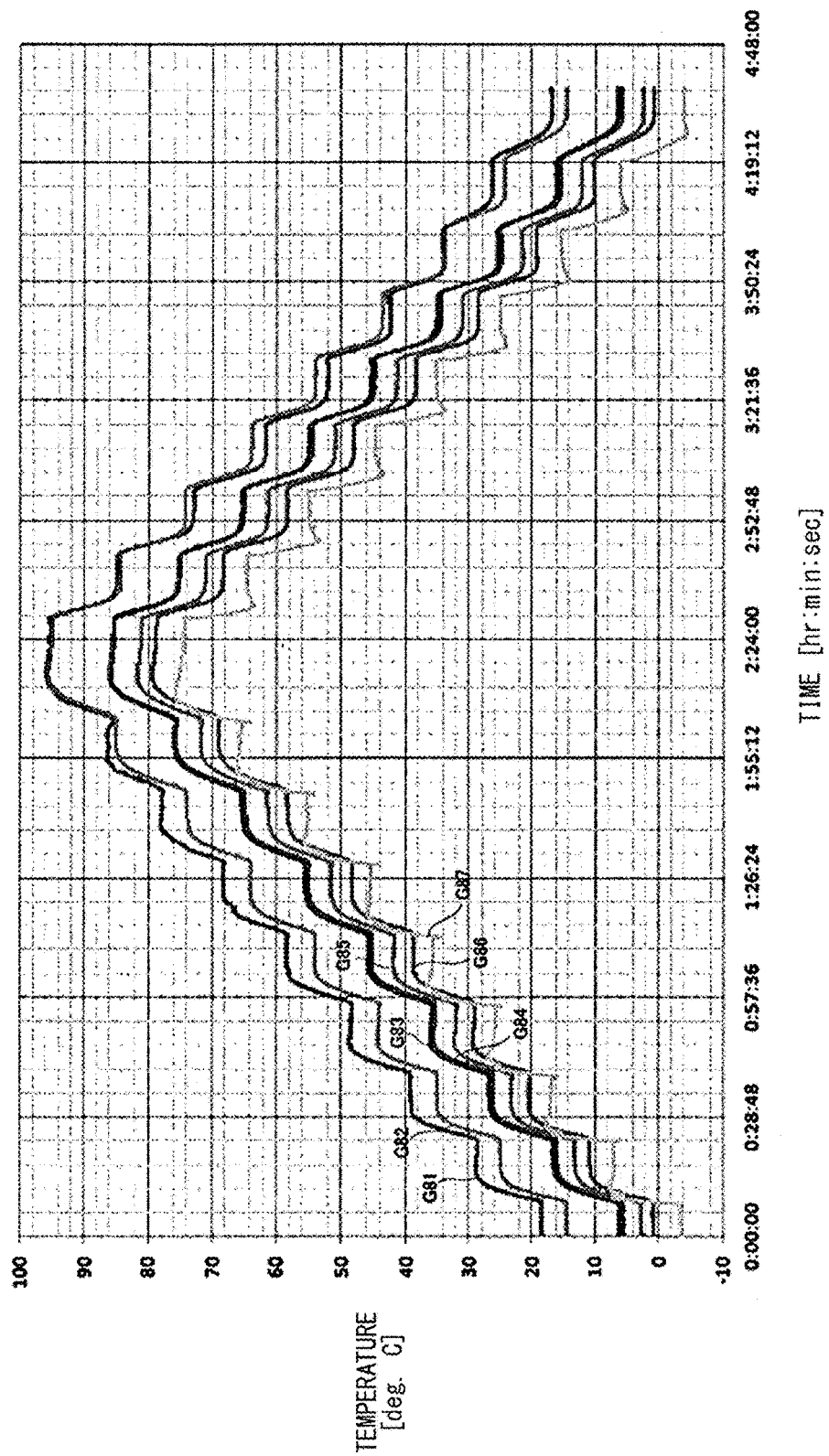
FIG. 16 is a diagram showing the measurement results of a temperature transition of each part with respect to changes in environmental temperature for a transmission on state of an optical signal according to the first embodiment of the present invention.

FIG. 16 is a diagram showing the measurement results of a temperature transition of each part with respect to changes in environmental temperature for the transmission on state of an optical signal according to the first embodiment of the present invention. In FIG. 16, a horizontal axis is time and a vertical axis is temperature. A graph G81 represents the temperature of the TRX-IC 12, a graph G82 represents the surface temperature of the CPU 11, a graph G83 represents the temperature of the ROSA, a graph G84 represents the temperature of the TOSA, a graph G85 represents the temperature of the casing K, and a graph G86 represents the temperature detected by the temperature sensor 21.

Referring to FIG. 16, it can be seen from the graphs G81 to G86 that the temperature of the casing K changes by the change in environmental temperature, and the temperature of each part in the casing K similarly changes following the temperature of the casing K.

Figure 17:
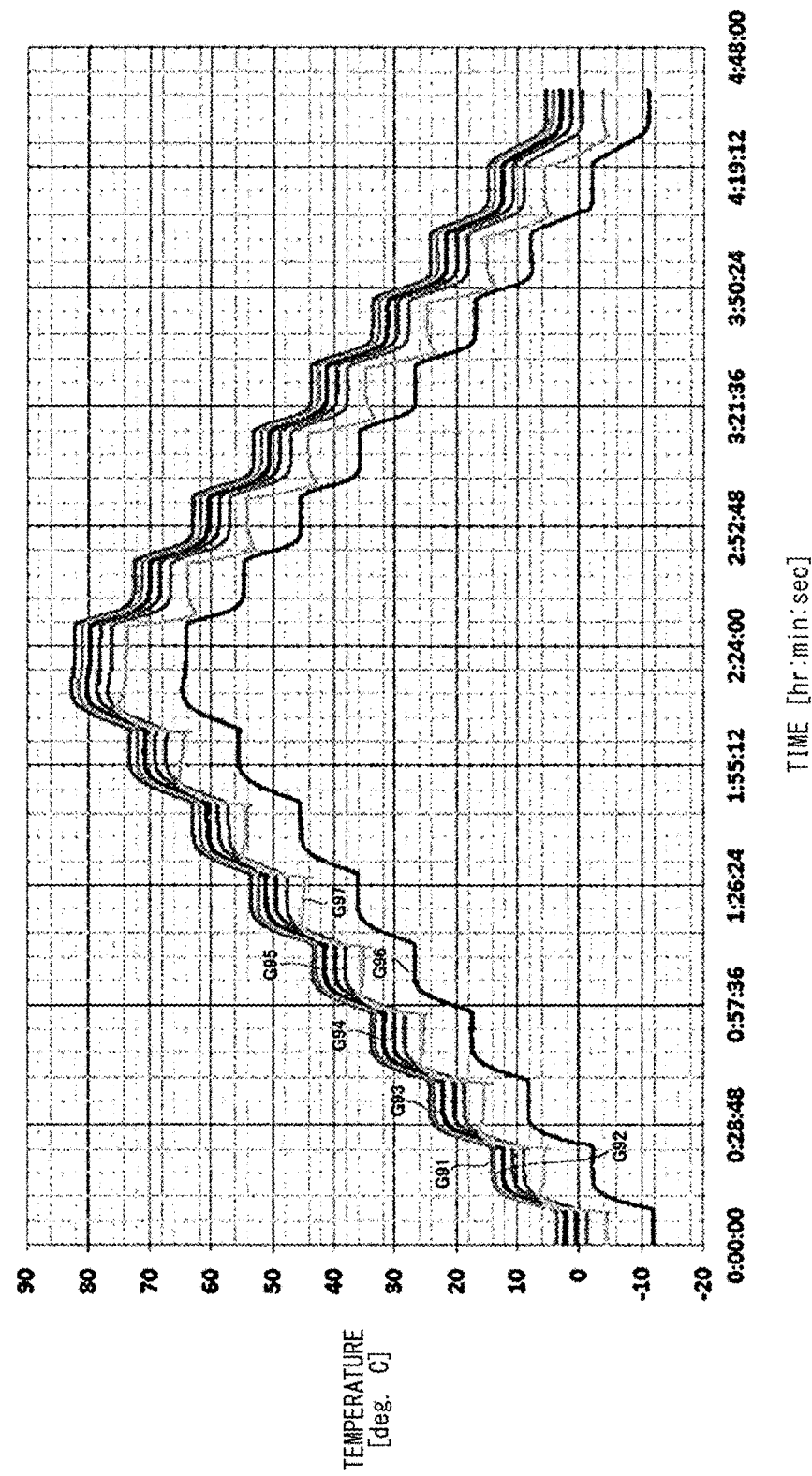
FIG. 17 is a diagram showing the measurement results of a temperature transition of each part with respect to changes in environmental temperature for a transmission off state of the optical signal according to the first embodiment of the present invention.

FIG. 17 is a diagram showing the measurement results of a temperature transition of each part with respect to changes in environmental temperature for the transmission off state of the optical signal according to the first embodiment of the present invention. In FIG. 17, a horizontal axis is time and a vertical axis is temperature. A graph G91 represents the temperature of the TRX-IC 12, a graph G92 represents the surface temperature of the CPU 11, a graph G93 represents the temperature of the ROSA, a graph G94 represents the temperature of the TOSA, a graph G95 represents the temperature of the casing K, and a graph G96 represents the temperature detected by the temperature sensor 21.

Referring to FIG. 17, as in FIG. 16, it can be seen from the graphs G91 to G96 that the temperature of the casing K changes by the change in environmental temperature, and the temperature of each part in the casing K similarly changes following the temperature of the casing K.

In addition, as with the measurement results shown in FIG. 9, it can be seen that the temperature detected by the temperature sensor 21 in the transmission off state is greatly shifted relative to the temperature of the casing K.

It can be seen from FIGS. 16 and 17 that the examination results obtained from FIGS. 9 to 15 similarly hold in terms of temperature transient characteristics, too.

From the results such as those described above, the inventor of the present application has devised an optimal control method for the reverse bias voltage Vapd in the optical transceiver 101, such as that shown below.

Specifically, focusing attention on the fact that in the optical transceiver 101 all relationships shown in FIGS. 9 to 15 maintain linearity over a range of low to high temperatures in both the transmission on state and transmission off state, the reverse bias voltage Vapd is controlled by the following method shown in (1) to (4).

(1) First, a control digital value is recorded for a plurality of temperatures, the control digital value being provided to the D/A converter in the CPU 11 to generate a reverse bias voltage Vapd at which the multiplication factor M obtains an optimal value in the transmission on state. A relationship between the temperature and the control digital value is linearly approximated.

(2) Then, a control digital value is recorded for a plurality of temperatures, the control digital value being provided to the D/A converter in the CPU 11 to generate a reverse bias voltage Vapd at which the multiplication factor M obtains an optimal value in the transmission off state. A relationship between the temperature and the control digital value is linearly approximated.

(3) Then, a burst duty ratio of a burst optical signal is computed. Specifically, a burst control signal is integrated using the integrator circuit 84.

(4) Then, a control digital value is determined by linear computation using the duty ratio as a variable.

FIG. 18 is a diagram showing an example of a lookup table used for control of the reverse bias voltage in the optical transceiver according to the first embodiment of the present invention.

Referring to FIG. 18, a lookup table ta1 is created in the above-described (1) and shows, for example, results obtained by performing linear approximation using measurement results obtained for temperatures of 0° C., 28° C., and 74° C. detected by the temperature sensor 21.

Specifically, in the lookup table ta1, by interpolating the measured temperatures by straight lines, control digital values x1 to x63 are registered in 2° C. steps over a range of −30° C. to 94° C.

FIG. 19 is a diagram showing an example of a lookup table used for control of the reverse bias voltage in the optical transceiver according to the first embodiment of the present invention.

Referring to FIG. 19, a lookup table ta2 is created in the above-described (2) and shows, for example, results obtained by performing linear approximation using measurement results obtained for temperatures of 0° C., 28° C., and 74° C. detected by the temperature sensor 21.

Specifically, in the lookup table ta2, by interpolating the measured temperatures by straight lines, control digital values y1 to y63 are registered in 2° C. steps over a range of −30° C. to 94° C.

In the above-described (4), for example, when the burst duty ratio of a burst optical signal is 10% in an environment with a temperature of 30° C., the control digital value is represented by the following equation:

$$\text{Control digital value}=y31+(x31-y31)\times 0.1$$

In addition, for example, when the burst duty ratio of a burst optical signal is 80% in an environment with a temperature of −2° C., the control digital value is represented by the following equation:

$$\text{Control digital value}=y15+(x15-y15)\times 0.8$$

When the difference between the temperature detected by the temperature sensor 21 in the transmission on state and the temperature detected by the temperature sensor 21 in the transmission off state is greater than 2° C. in the optical transceiver 101, i.e., when the difference is greater than the control step width of the lookup tables ta1 and ta2, the control method for the reverse bias voltage Vapd such as that described above is useful. In addition, for example, when, from the measurement results shown in FIG. 9, the difference between the temperatures detected by the temperature sensor 21 in the transmission on state and transmission off state is 8° C. or more, the control method for the reverse bias voltage Vapd such as that described above is more useful and desirable.

Referring back to FIG. 4, the bias control unit 83 adjusts the reverse bias voltage Vapd by linear computation using a plurality of target values of the reverse bias voltage Vapd for combinations of a plurality of temperatures and a plurality of duty ratios, based on the temperature detected by the temperature sensor 21 and the result of calculation of the duty ratio by the integrator circuit 84.

The memory unit 23 in the CPU 11 stores correspondence relationships between the target value of the reverse bias voltage Vapd and the temperature for each duty ratio. The bias control unit 83 adjusts the reverse bias voltage Vapd, based on a plurality of target values appropriate to the temperature detected by the temperature sensor 21 in the correspondence relationships and the result of calculation of the duty ratio.

Specifically, for example, the memory unit 23 stores the lookup tables ta1 and ta2 such as those described above.

The CPU 11 obtains a control digital value by referring to the lookup tables ta1 and ta2, based on a voltage Vi received from the integrator circuit 84 and a temperature detected by the temperature sensor 21, and generates and outputs a current Ictrl with a magnitude corresponding to the obtained control digital value.

Figure 20:
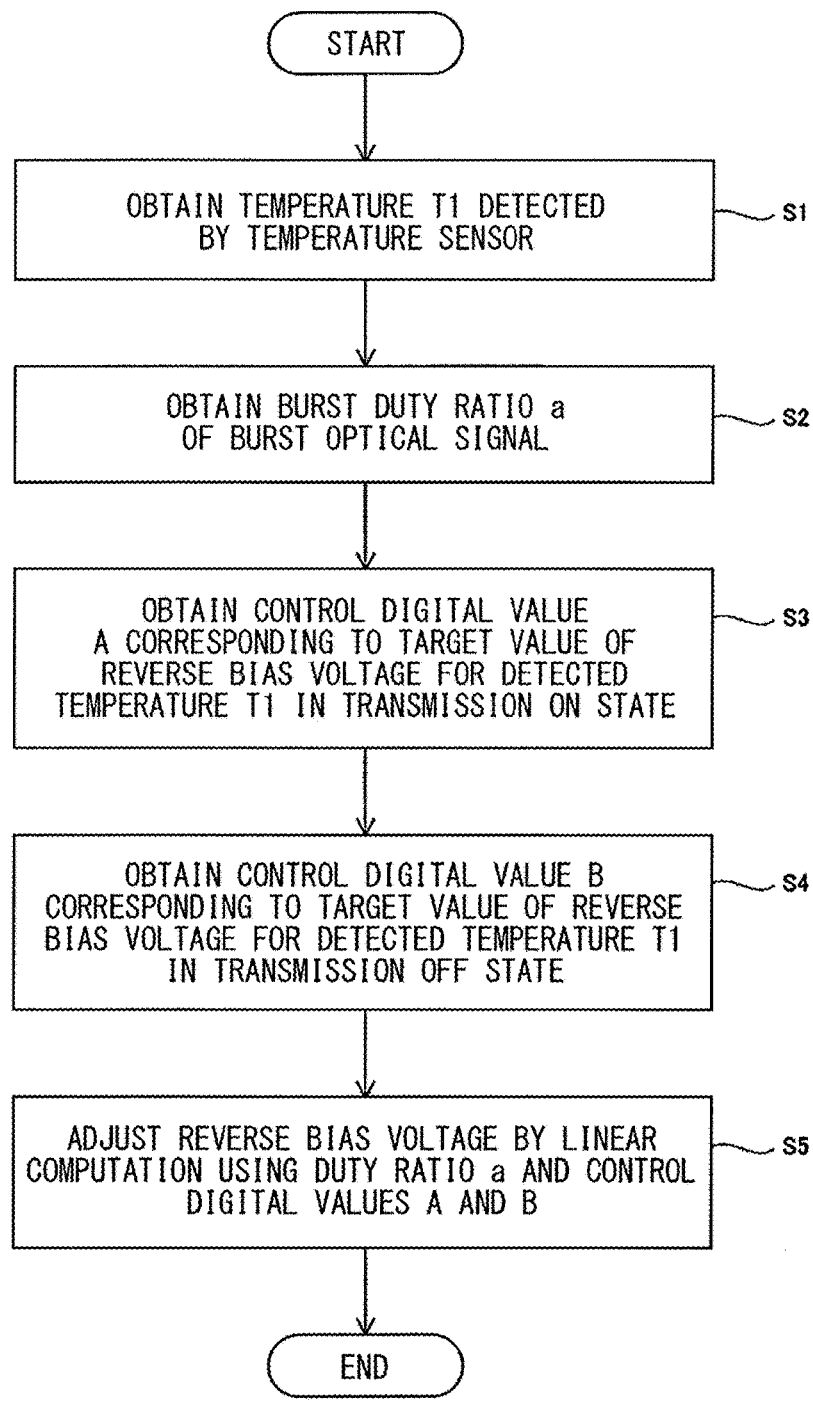
FIG. 20 is a flowchart showing a procedure of a method of controlling the light receiving element in the optical transceiver according to the first embodiment of the present invention.

FIG. 20 is a flowchart showing a procedure of a method of controlling the light receiving element in the optical transceiver according to the first embodiment of the present invention.

In the method of controlling the light receiving element PD in the optical transceiver 101, first, a burst duty ratio a of an optical signal is calculated.

Then, the reverse bias voltage Vapd applied to the light receiving element PD is adjusted. At this time, the reverse bias voltage Vapd is adjusted by linear computation using a plurality of target values of the reverse bias voltage Vapd for combinations of a plurality of temperatures and a plurality of duty ratios a, based on the temperature detected by the temperature sensor 21 and the result of calculation of the duty ratio a.

Specifically, referring to FIG. 20, first, the CPU 11 obtains a temperature T1 detected by the temperature sensor 21 (step S1).

Then, the CPU 11 obtains a burst duty ratio a of a burst optical signal, based on a voltage Vi received from the integrator circuit 84 (step S2).

Then, the CPU 11 reads the lookup table ta1 in the memory unit 23 and obtains, from the lookup table ta1, a control digital value A corresponding to a target value of the reverse bias voltage Vapd for the detected temperature T1 in the transmission on state (step S3).

Then, the CPU 11 reads the lookup table ta2 in the memory unit 23 and obtains, from the lookup table ta2, a control digital value B corresponding to a target value of the reverse bias voltage Vapd for the detected temperature T1 in the transmission off state (step S4).

Then, the CPU 11 adjusts the reverse bias voltage Vapd by linear computation using the duty ratio a, the control digital value A, and the control digital value B. Specifically, the CPU 11 calculates a control digital value of the D/A converter included therein according to, for example, the following equation (step S5):

Control digital value=$B+(A-B) \times a$

Note that in the procedure shown in FIG. 20, the order of steps S1 and S2 may be changed. Note also that the order of some or all of steps S2 to S4 may be changed.

Approximate models for temperatures in the optical transceiver 101 will be described in detail below. First, the environmental temperature is set as Ta, and the temperature of the ROSA, the temperature of the CPU 11, and the temperature of the TRX-IC 12 for the transmission on state are set as Tr, Tc, and TI, respectively.

When the measurement results for the transmission on state shown in FIGS. 9 to 15 are linearly approximated, Tr, TI, and Tc are represented by the following equations, respectively:

$Tr=1.0157 \times Ta+9.5013$ $TI=0.9906 \times Ta+22.413$ $Tc=1.0289 \times Ta+17.701$ Here, when Tr is set such that $Tr=A \times Tc+B \times TI$, and $Ta=-5$ and 75 are substituted, the following equation (1) can be derived:

$$Tr=2.4163 \times Tc-1.4844 \times TI \quad (1)$$

Then, the temperature of the ROSA, the temperature of the CPU 11, and the temperature of the TRX-IC 12 for the transmission off state are set as Trd, Tcd, and TId, respectively.

When the measurement results for the transmission off state shown in FIGS. 9 to 15 are linearly approximated, Trd, TId, and Tcd are represented by the following equations, respectively:

$Trd=0.9911 \times Ta+6.627$ $TId=1.0027 \times Ta+8.3841$ $Tcd=0.9877 \times Ta+8.1261$ Here, when Trd is set such that $Trd=Ad \times Tcd+Bd \times TId$, and $Ta=-5$ and 75 are substituted, the following equations (2) to (4) can be derived:

$$Trd=12.52181 \times Tcd-11.3461 \times TId \quad (2)$$

$$Tcd=0.959957 \times Tc-8.866103 \quad (3)$$

$$TId=1.012215 \times TI-14.30268 \quad (4)$$

When equation (3) and equation (4) are substituted into equation (2), the following equation (5) can be derived:

$$Trd=12.0204 \times Tc-11.48469 \times TI+51.25998 \quad (5)$$

By equation (1) and equation (5), the following equation (6) can be derived:

$$Pr-Trd=-9.6041 \times Tc+10.00029 \times TI+51.25998 \quad (6)$$

Here, when the burst duty ratio of a burst optical signal is (100×a) % and the temperature of the ROSA for this duty ratio is Tr_a, Tr_a is represented by the following equation (7):

$$Tr\_a=Trd+a \times (Tr-Trd) \quad (7)$$

By equations (5) to (7), the following equation can be derived:

$$Tr\_a=(12.0204-9.6041\times a)\times Tc+(-11.48469+10.00029\times a)\times TI+(1-a)\times 51.25998$$

By the above, the temperature Tr_a of the ROSA corresponding to the temperature of the light receiving element PD to which the reverse bias voltage Vapd is to be applied can be represented by an approximate model equation using a, Tc, and TI.

Note that in this approximate model derivation, for convenience of measurement, the surface temperature of the CPU 11 is used as Tc and the surface temperature of the TRX-IC 12 is used as TI, and they respectively correspond to the temperatures detected by the temperature sensors 21 and 22 which are used for actual control of the reverse bias voltage Vapd.

The inventor of the present application has further studied the viability of the above-described approximate models also including temperature transitions.

Figure 21:
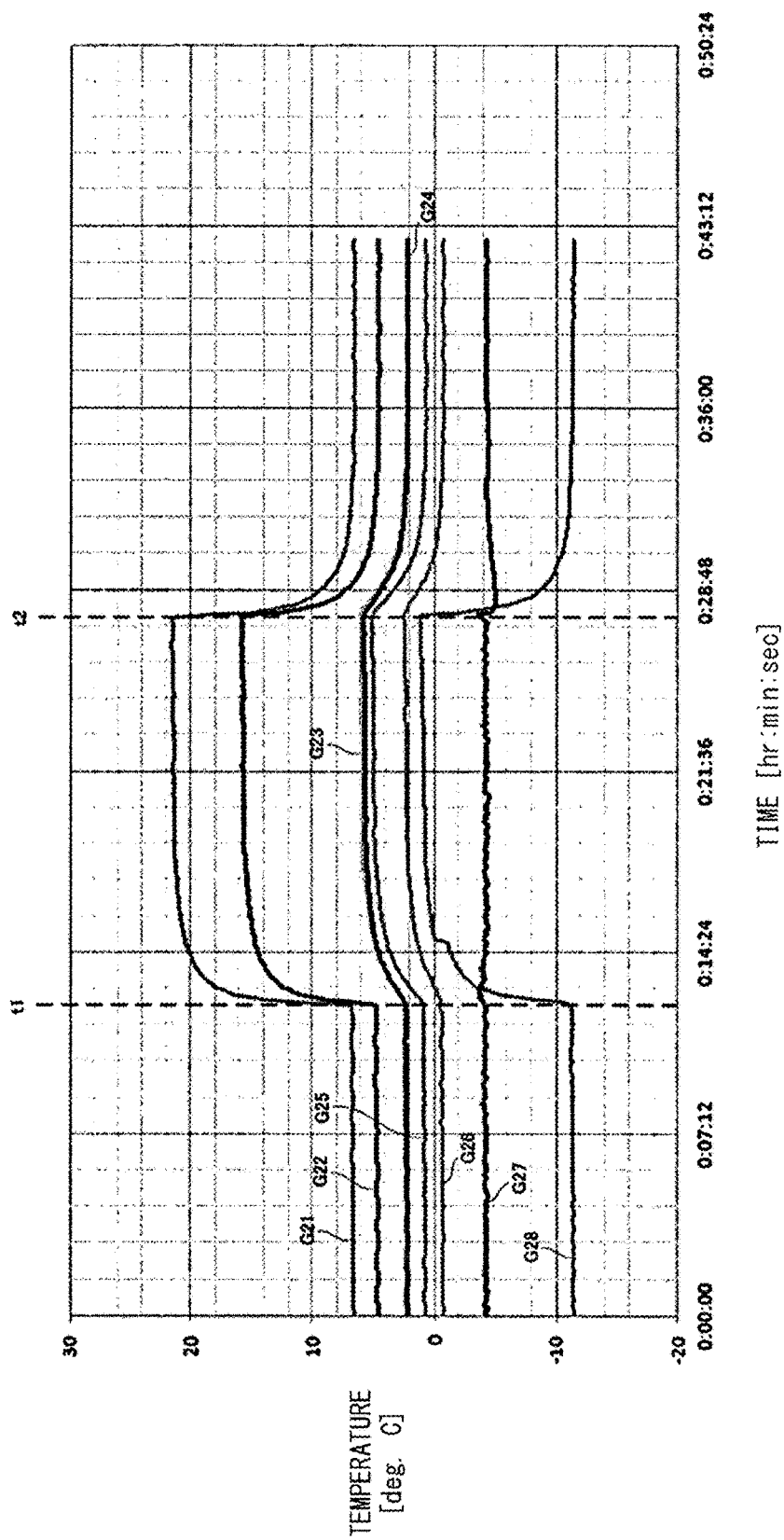
FIG. 21 is a diagram showing the measurement results of a temperature transition of each part with respect to a transition between the transmission on state and transmission off state of the optical signal according to the first embodiment of the present invention.

FIG. 21 is a diagram showing the measurement results of a temperature transition of each part with respect to a transition between the transmission on state and transmission off state of the optical signal according to the first embodiment of the present invention. In FIG. 21, a horizontal axis is time and a vertical axis is temperature. A graph G21 represents the temperature of the TRX-IC 12, a graph G22 represents the surface temperature of the CPU 11, a graph G23 represents the temperature of the ROSA, a graph G24 represents the computed value, by an approximate expression, of the temperature of the ROSA, a graph G25 represents the temperature of the TOSA, a graph G26 represents the temperature of the casing K, a graph G27 represents the environmental temperature, and a graph G28 represents the temperature detected by the temperature sensor 21. FIG. 21 shows the measurement results for an environment with a temperature of −5° C.

Referring to FIG. 21, from the graphs G21 to G23, G25, and G26, the temperature of each part starts to rise near time t1 at which switching from the transmission off state to the transmission on state is performed, and converges in about six minutes. Then, the temperature of each part starts to fall near time t2 at which switching from the transmission on state to the transmission off state is performed, and converges in about six minutes.

Figure 22:
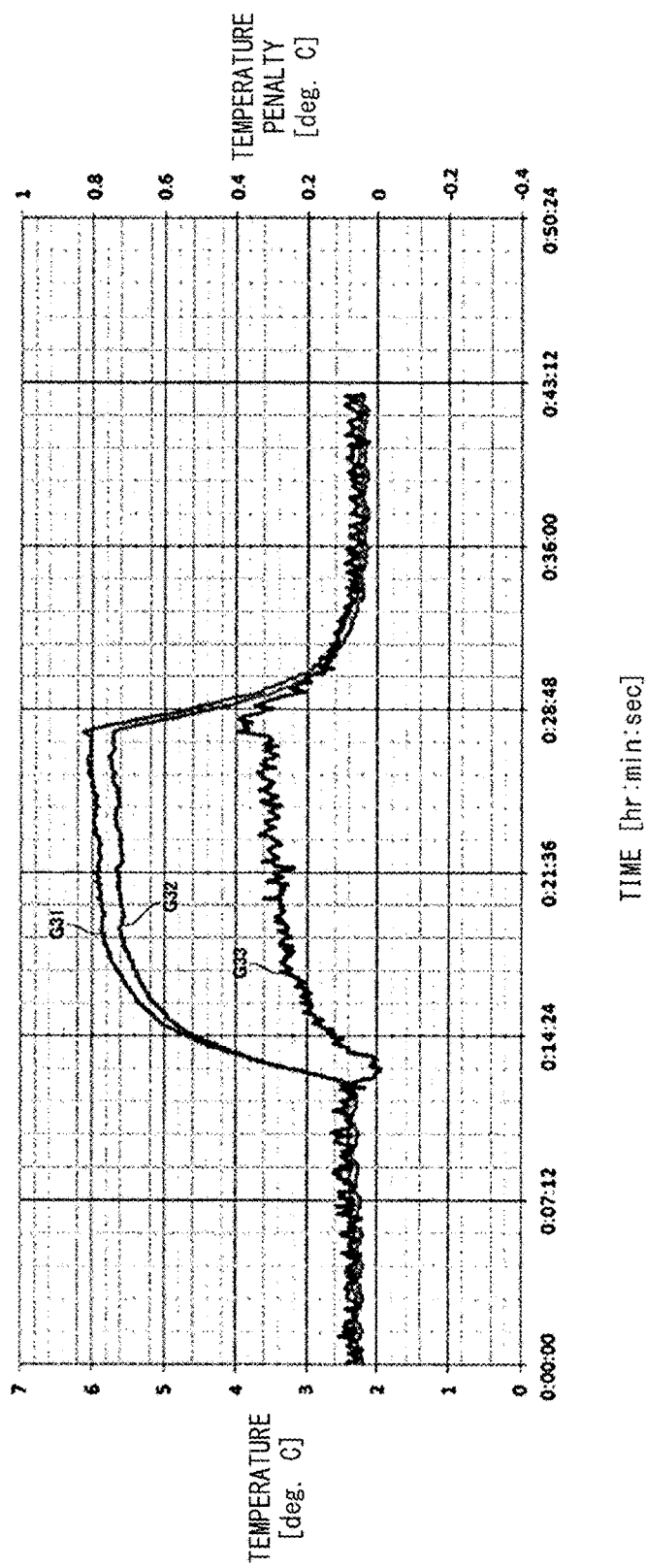
FIG. 22 is an enlarged view of a part of FIG. 21.

FIG. 22 is an enlarged view of a part of FIG. 21. In FIG. 22, a horizontal axis is time and a vertical axis is temperature. A graph G31 represents the temperature of the ROSA, a graph G32 represents the computed value, by an approximate expression, of the temperature of the ROSA, and a graph G33 represents the temperature penalty indicating an estimation error, i.e., the difference between the graphs G31 and G32.

Referring to FIG. 22, from the graphs G31 to G33, the difference between the measured value and computed value of the temperature of the ROSA is approximately 0° C. to +0.4° C.

Figure 23:
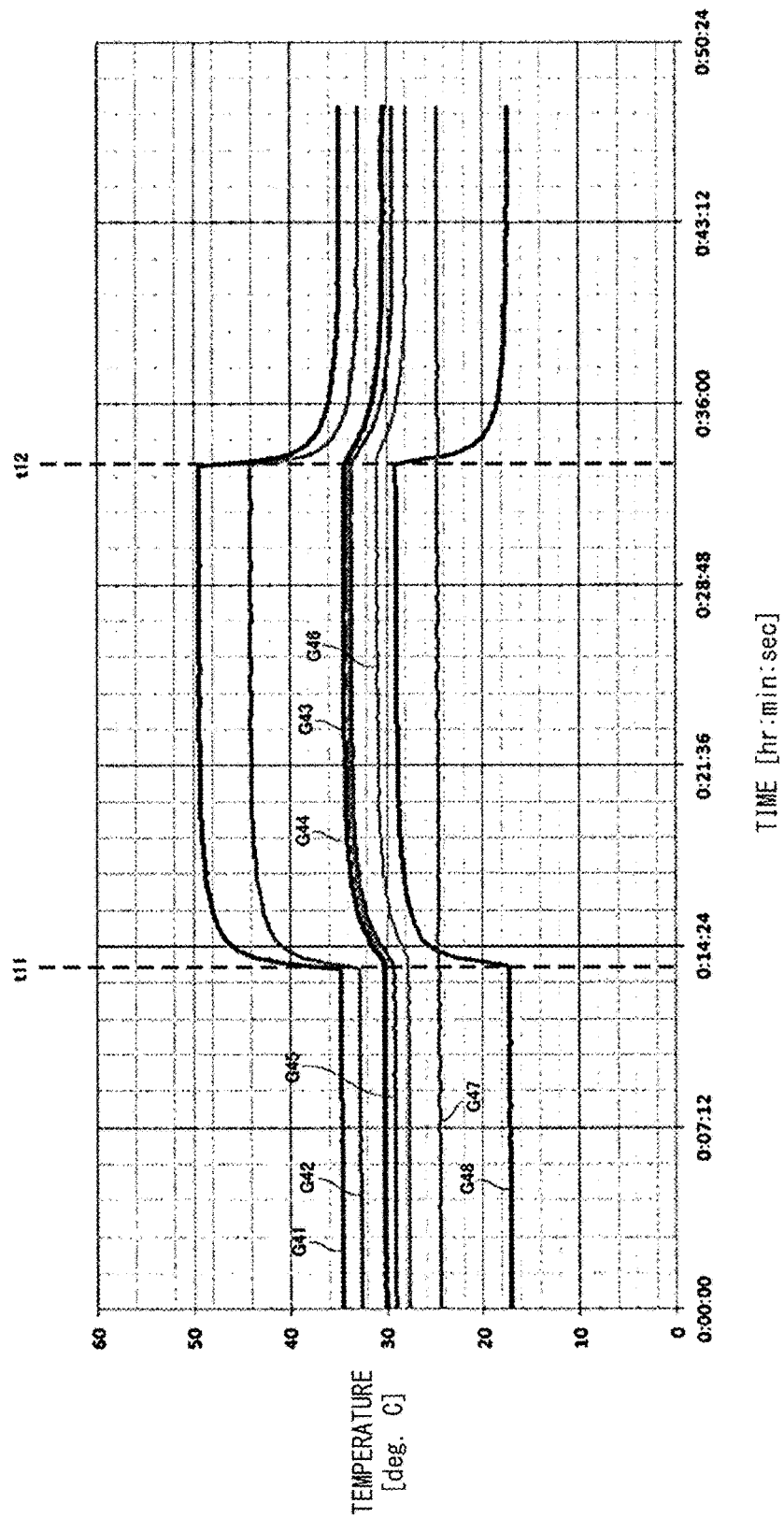
FIG. 23 is a diagram showing the measurement results of a temperature transition of each part with respect to a change between the transmission on state and transmission off state of the optical signal according to the first embodiment of the present invention.

FIG. 23 is a diagram showing the measurement results of a temperature transition of each part with respect to a change between the transmission on state and transmission off state of the optical signal according to the first embodiment of the present invention. In FIG. 23, a horizontal axis is time and a vertical axis is temperature. A graph G41 represents the temperature of the TRX-IC 12, a graph G42 represents the surface temperature of the CPU 11, a graph G43 represents the temperature of the ROSA, a graph G44 represents the computed value, by an approximate expression, of the temperature of the ROSA, a graph G45 represents the temperature of the TOSA, a graph G46 represents the temperature of the casing K, a graph G47 represents the environmental temperature, and a graph G48 represents the temperature detected by the temperature sensor 21. FIG. 23 shows the measurement results for an environment with a temperature of +25° C.

Referring to FIG. 23, from the graphs G41 to G43, G45, and G46, the temperature of each part starts to rise near time t11 at which switching from the transmission off state to the transmission on state is performed, and converges in about six minutes. Then, the temperature of each part starts to fall near time t12 at which switching from the transmission on state to the transmission off state is performed, and converges in about six minutes.

Figure 24:
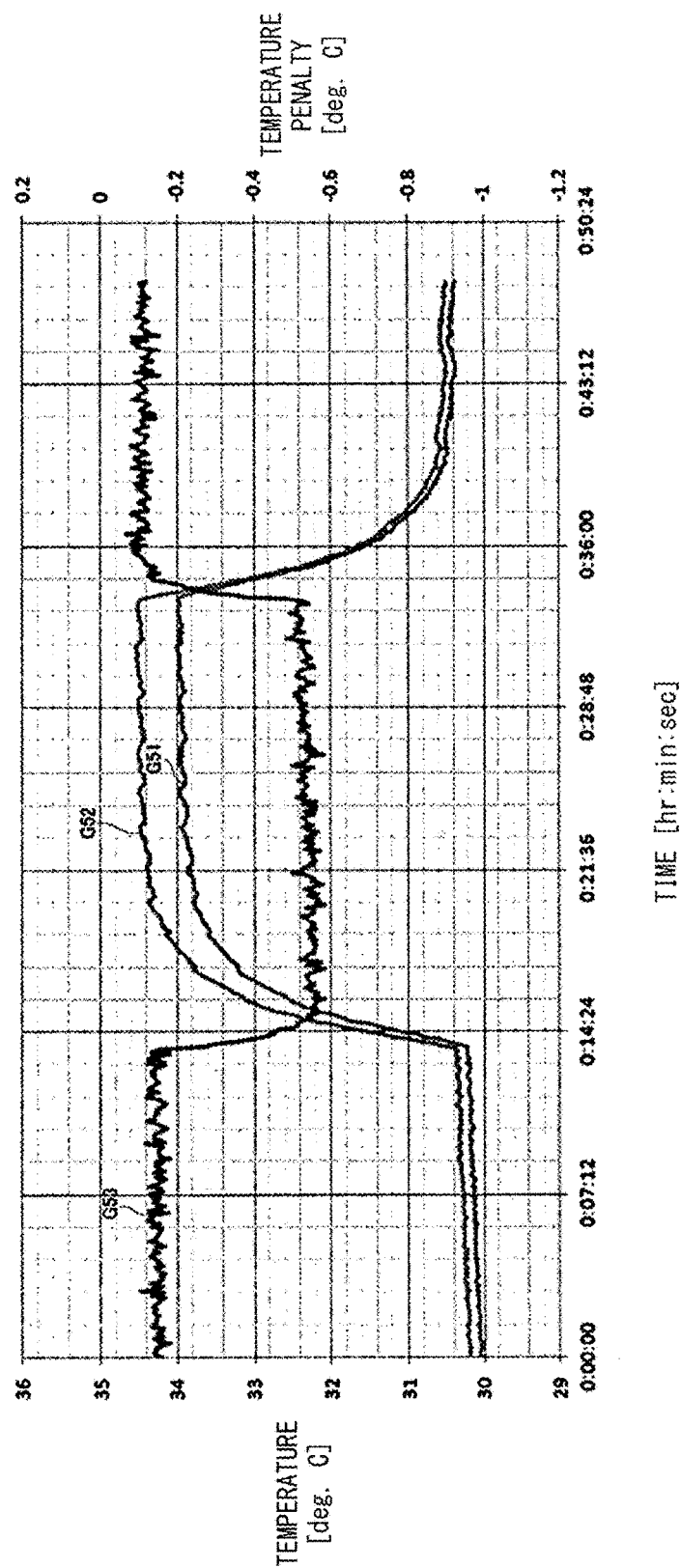
FIG. 24 is an enlarged view of a part of FIG. 23.

FIG. 24 is an enlarged view of a part of FIG. 23. In FIG. 24, a horizontal axis is time and a vertical axis is temperature. A graph G51 represents the temperature of the ROSA, a graph G52 represents the computed value, by an approximate expression, of the temperature of the ROSA, and a graph G53 represents the temperature penalty indicating an estimation error, i.e., the difference between the graphs G51 and G52.

Referring to FIG. 24, from the graphs G51 to G53, the difference between the measured value and computed value of the temperature of the ROSA is approximately −0.6° C. to +0° C.

Figure 25:
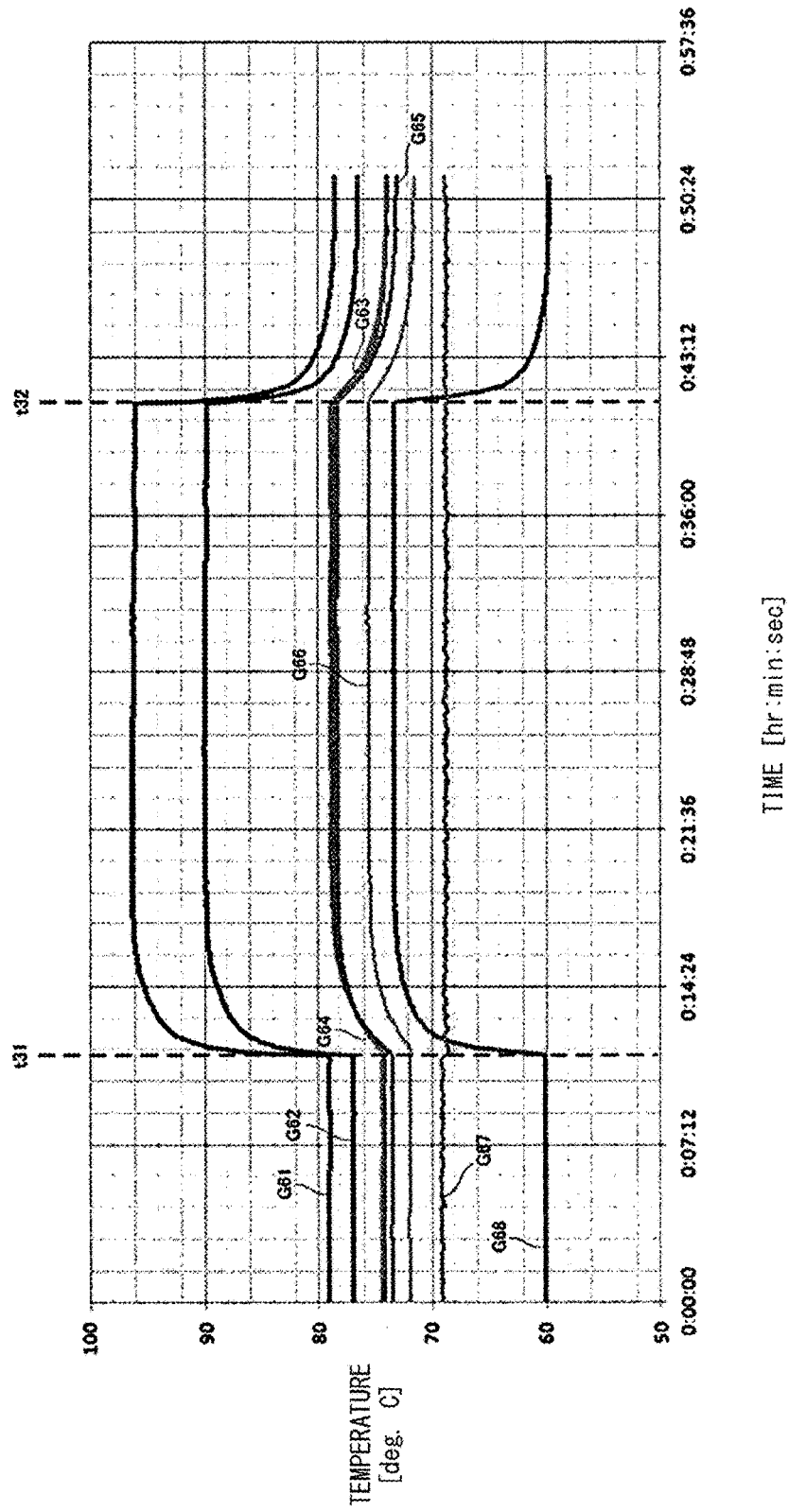
FIG. 25 is a diagram showing the measurement results of a temperature transition of each part with respect to a change between the transmission on state and transmission off state of the optical signal according to the first embodiment of the present invention.

FIG. 25 is a diagram showing the measurement results of a temperature transition of each part with respect to a change between the transmission on state and transmission off state of the optical signal according to the first embodiment of the present invention. In FIG. 25, a horizontal axis is time and a vertical axis is temperature. A graph G61 represents the temperature of the TRX-IC 12, a graph G62 represents the surface temperature of the CPU 11, a graph G63 represents the temperature of the ROSA, a graph G64 represents the computed value, by an approximate expression, of the temperature of the ROSA, a graph G65 represents the temperature of the TOSA, a graph G66 represents the temperature of the casing K, a graph G67 represents the environmental temperature, and a graph G68 represents the temperature detected by the temperature sensor 21. FIG. 25 shows the measurement results for an environment with a temperature of +70° C.

Referring to FIG. 25, from the graphs G61 to G63, G65, and G66, the temperature of each part starts to rise near time t31 at which switching from the transmission off state to the transmission on state is performed, and converges in about six minutes. Then, the temperature of each part starts to fall near time t32 at which switching from the transmission on state to the transmission off state is performed, and converges in about six minutes.

Figure 26:
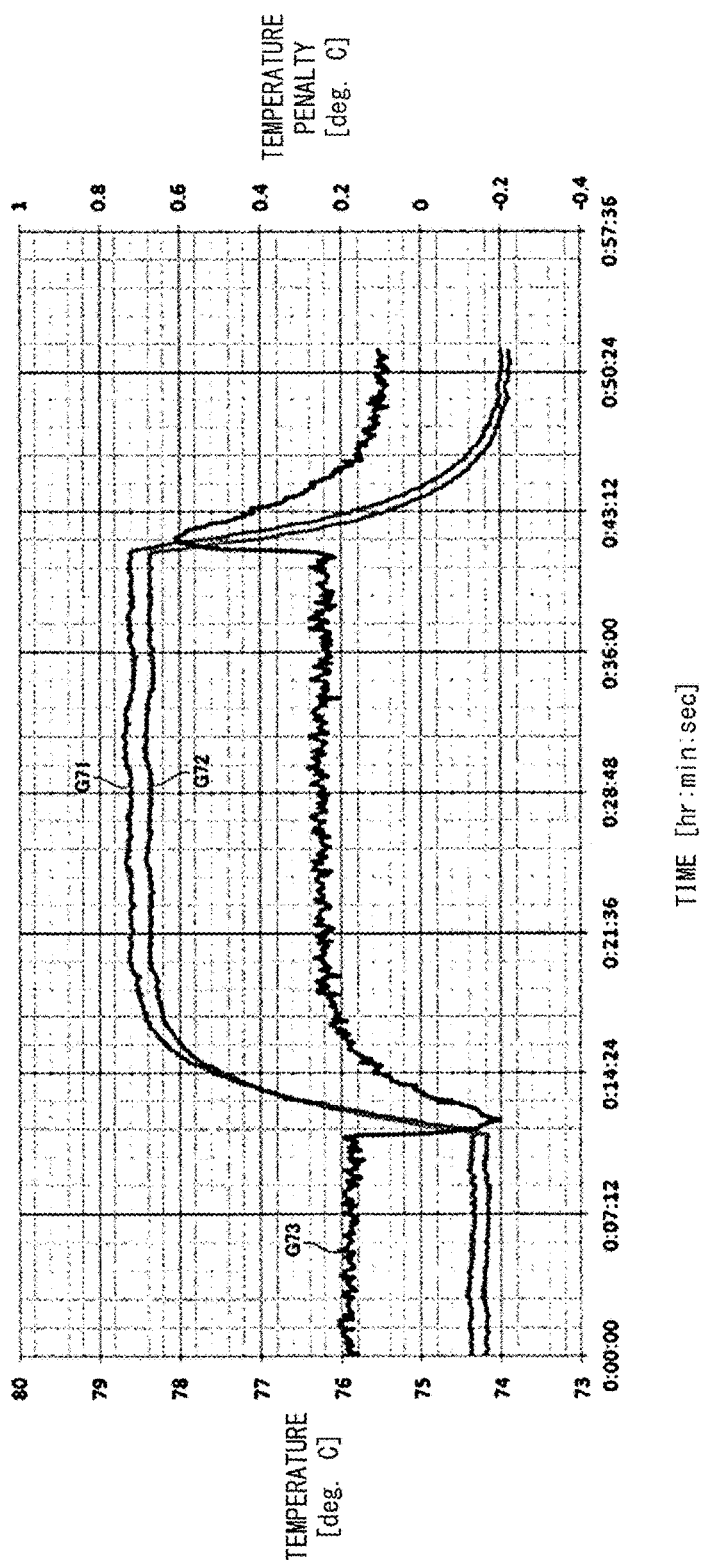
FIG. 26 is an enlarged view of a part of FIG. 25.

FIG. 26 is an enlarged view of a part of FIG. 25. In FIG. 26, a horizontal axis is time and a vertical axis is temperature. A graph G71 represents the temperature of the ROSA, a graph G72 represents the computed value, by an approximate expression, of the temperature of the ROSA, and a graph G73 represents the temperature penalty indicating an estimation error, i.e., the difference between the graphs G71 and G72.

Referring to FIG. 26, from the graphs G71 to G73, the difference between the measured value and computed value of the temperature of the ROSA is approximately −0.2° C. to +0.6° C.

Note that in FIGS. 21 to 26 the following equation is used as an approximate model representing the temperature Tr_a of the ROSA. The equation can be derived by the same method as that described above. In addition, computation by the approximate expression is performed using, as a duty ratio a, a temporal reach factor for from state switching timing to temperature convergence timing.

$$Tr\_a=(2.132436+0.618751 \times a) \times Tc-(1.1555+0.6018 \times a) \times TI+(a-1) \times 6.793542$$

From FIGS. 21 to 26, at the low, normal, and high temperatures, specifically, for example, at −5° C., 25° C., and 70° C., the temperature penalty is not even 0.7° C. in both the positive and negative directions, and only a little change in temperature penalty is seen upon a temperature transient, particularly, at the high temperature.

From the examination results such as those described above, the inventor of the present application has obtained findings that the temperature Tr_a of the ROSA including the midpoint of a temperature transition can be estimated by the approximate model equation using a, Tc, and TI, and the equation does not require a term including a time constant.

Specifically, in the optical transceiver 101, the burst duty ratio of an optical signal is set as a, the temperature detected by the temperature sensor 21 is set as T1, the temperature detected by the temperature sensor 22 is set as T2, the temperature of the light receiving unit in the BOSA optical module 13 is set as Tr, and the temperature error allowed for control of the light receiving unit in the BOSA optical module 13 is set as Terr.

Then, when, in a state in which the ambient temperature of the casing K in the transmission on state is a predetermined temperature, the value of Tr that can be estimated from T1 and T2 with a being a minimum value is set as Tmin and the value of Tr that can be estimated from T1 and T2 with a being a maximum value is set as Tmax, the error in a measured value of Tr with respect to an estimated value of Tr which is obtained by internally dividing Tmin and Tmax by a when a is a median value of the minimum value and the maximum value is Terr or less.

For example, the temperature error Terr is 2° C. which is the step width of the lookup tables ta1 and ta2. From FIGS. 21 to 26, in the optical transceiver 101, the error in the temperature Tr of the ROSA, i.e., the absolute value of the temperature penalty, is less than 0.7° C.

In the optical transceiver 101, by applying a reverse bias voltage Vapd appropriate to the thus estimated temperature Tr_a of the ROSA to the light receiving element PD, the multiplication factor M is adjusted according to the temperature of the light receiving element PD, enabling to maintain an optimal value.

Namely, in the optical transceiver 101, the casing K having thermal conductivity is provided and a thermal coupling state between a heat generating portion, i.e., the transmission driver DV, and the temperature sensors 21 and 22 is accurately achieved, by which a favorable thermal coupling state can be achieved that allows an error in the temperature Tr of the ROSA to be Terr or less.

Note that although in the optical transceiver according to the first embodiment of the present invention the CPU 11 is configured to adjust the reverse bias voltage Vapd based on the temperature detected by the temperature sensor 21, the configuration is not limited thereto. The CPU 11 may be configured to adjust the reverse bias voltage Vapd based on the temperature detected by the temperature sensor 22 in the TRX-IC 12. In this case, for example, the lookup tables ta1 and ta2 are created using the temperatures detected by the temperature sensor 22.

In addition, although in the optical transceiver according to the first embodiment of the present invention the temperature sensor 21 is configured to be included in the CPU 11, the configuration is not limited thereto. The temperature sensor 21 may be configured to be provided external to the CPU 11.

In addition, although in the optical transceiver according to the first embodiment of the present invention the temperature sensor 22 is configured to be included in the TRX-IC 12, the configuration is not limited thereto. The temperature sensor 22 may be configured to be provided external to the TRX-IC 12 as long as the temperature sensor 22 is thermally coupled to the TRX-IC 12.

In addition, although the optical transceiver according to the first embodiment of the present invention is configured such that the burst duty ratio of a burst optical signal is used for control of the reverse bias voltage Vapd, the configuration is not limited thereto. The value to be used is not limited to the duty ratio, and any other type of value may be used as long as the value indicates the drive rate of the transmission driver DV.

In addition, although the optical transceiver according to the first embodiment of the present invention is configured to include the bias control unit 83 and the integrator circuit 84, the configuration is not limited thereto. The configuration may be such that the bias control unit 83 and the integrator circuit 84 are provided external to the optical transceiver 101 within the ONU 202.

In addition, although the optical transceiver according to the first embodiment of the present invention is configured to include the temperature sensor 22, the configuration is not limited thereto, and the optical transceiver may be configured to not include the temperature sensor 22.

In addition, although the first embodiment of the present invention exemplifies an ONU including an optical transceiver, the present invention is widely applicable to optical communication apparatuses. In addition, the present invention is suitable for use in an optical communication apparatus that transmits a burst-like optical signal. Particularly, the present invention is more effective for use in optical network units in a PON system which are manufactured in large numbers according to the same specifications upon manufacturing and which have individually different multiplication factors of a light receiving element according to the environment of an installation location upon actual use.

Meanwhile, the optical transceiver described in Patent Literature 1 performs feedforward control using a temperature sensor and a lookup table for temperatures within the optical transceiver.

However, for example, when the optical transceiver performs different operations according to the communication state, and accordingly, the power consumption changes and the amount of heat generated changes, the temperature detected by the above-described temperature sensor also changes.

In such a case, even if the optical transceiver performs feedforward control using the lookup table such as that described above, it is difficult to favorably adjust a reverse bias voltage applied to an APD, according to the temperature of the APD.

On the other hand, in an optical communication apparatus according to the first embodiment of the present invention, the transmission driver DV drives the light emitting element LD. The light receiving element PD can change the multiplication factor by the reverse bias voltage Vapd. The integrator circuit 84 calculates a drive rate a of the transmission driver DV, e.g., a burst duty ratio a of a burst optical signal. The bias control unit 83 adjusts the reverse bias voltage Vapd applied to the light receiving element PD. The bias control unit 83 adjusts the reverse bias voltage Vapd by linear computation using a plurality of target values of the reverse bias voltage Vapd for combinations of a plurality of temperatures and a plurality of drive rates a, based on the temperature detected by the temperature sensor 21 and the result of calculation of the drive rate a.

By such a configuration, even when the optical communication apparatus performs different operations according to the communication state, specifically, for example, operations with different burst duty ratios of a burst optical signal, and accordingly, the power consumption changes and the amount of heat generated changes, the optical communication apparatus can perform control according to a change in temperature detected by the temperature sensor. Specifically, for example, by performing feedforward control using the lookup tables ta1 and ta2, according to the temperature detected by the temperature sensor 21 and the duty ratio a, the reverse bias voltage Vapd applied to the light receiving element PD can be favorably adjusted according to the temperature of the light receiving element PD.

Therefore, the optical communication apparatus according to the first embodiment of the present invention can favorably adjust the bias voltage applied to the light receiving element.

In addition, in the optical transceiver according to the first embodiment of the present invention, the CPU 11 can perform a computation process using a temperature detected by the temperature sensor 21. The BOSA optical module 13 includes the light emitting element LD and the light receiving element PD. The transmission driver DV drives the light emitting element LD. The casing K has thermal conductivity and accommodates the temperature sensor 21, the CPU 11, the BOSA optical module 13, and the transmission driver DV. The difference between the temperature detected by the temperature sensor 21 in a transmission on state and the temperature detected by the temperature sensor 21 in a transmission off state is greater than 2° C. The power consumption of the transmission driver DV is higher than that of the CPU 11 and that of the BOSA optical module 13.

As such, the optical transceiver 101 is configured such that the power consumption, i.e., heat generation, of the transmission driver DV is predominant in the casing K having thermal conductivity, and the heat generation causes a temperature rise of an integrated circuit, i.e., the CPU 11, and the BOSA optical module 13. That is, the optical transceiver 101 is in conditions where a large amount of power consumption is provided to the transmission driver DV; in other words, the optical transceiver 101 can output a high-strength optical signal or output a high-speed optical signal.

The optical transceiver 101 has a configuration suitable for use in the above-described optical communication apparatus that adjusts the reverse bias voltage Vapd by linear computation using a plurality of target values of the reverse bias voltage Vapd. Namely, the optical transceiver 101 and the optical communication apparatus are suitable for combination use and have the same or corresponding special technical features.

Therefore, the optical transceiver 101 according to the first embodiment of the present invention can favorably adjust the bias voltage applied to the light receiving element.

In addition, in the optical transceiver 101 according to the first embodiment of the present invention, the transmission driver DV is disposed between the temperature sensor 21 and the BOSA optical module 13.

As such, the optical transceiver 101 including the temperature sensor 21 that is disposed at a location where the temperature sensor 21 is susceptible to the transmission driver DV and it is difficult for the temperature sensor 21 to measure an accurate temperature of the BOSA optical module 13 can favorably adjust the bias voltage applied to the light receiving element PD.

In addition, in the optical transceiver according to the first embodiment of the present invention, the BOSA optical module 13 includes the light emitting element LD and the light receiving element PD. The temperature sensor 22 is thermally coupled to the transmission driver DV, and the transmission driver DV drives the light emitting element LD. The casing K has thermal conductivity and accommodates the temperature sensor 21, the temperature sensor 22, the BOSA optical module 13, and the transmission driver DV. The drive rate of the transmission driver DV is set as a, the temperature detected by the temperature sensor 21 is set as T1, the temperature detected by the temperature sensor 22 is set as T2, the temperature of the light receiving unit in the BOSA optical module 13 is set as Tr, and the temperature error allowed for control of the light receiving unit in the BOSA optical module 13 is set as Terr. Then, when, in a state in which the ambient temperature of the casing K in a transmission on state is a predetermined temperature, the value of Tr that can be estimated from T1 and T2 with a being a minimum value is set as Tmin and the value of Tr that can be estimated from T1 and T2 with a being a maximum value is set as Tmax, the error in a measured value of Tr with respect to an estimated value of Tr which is obtained by internally dividing Tmin and Tmax by a when a is a median value of the minimum value and the maximum value is Terr or less.

As such, in the optical transceiver 101, the casing K having thermal conductivity is provided and a thermal coupling state between a heat generating portion, i.e., the transmission driver DV, and the temperature sensors 21 and 22 is accurately achieved, by which a favorable thermal coupling state can be achieved that allows an error in the temperature Tr of the ROSA in the BOSA optical module 13 to be Terr or less.

Then, by applying a reverse bias voltage Vapd appropriate to an accurately estimated temperature Tr of the ROSA to the light receiving element PD, the multiplication factor M is adjusted according to the temperature of the light receiving element PD, enabling to maintain an optimal value.

Namely, the optical transceiver 101 has a configuration suitable for use in the above-described optical communication apparatus that adjusts the reverse bias voltage Vapd by linear computation using a plurality of target values of the reverse bias voltage Vapd. Namely, the optical communication apparatus and the optical transceiver 101 are suitable for combination use and have the same or corresponding special technical features.

Therefore, the optical transceiver 101 according to the first embodiment of the present invention can favorably adjust the bias voltage applied to the light receiving element.

In addition, in a method of controlling the light receiving element PD according to the first embodiment of the present invention, first, a drive rate a of the transmission driver DV is calculated. Then, the reverse bias voltage Vapd applied to the light receiving element PD is adjusted. Upon adjusting the reverse bias voltage Vapd, the reverse bias voltage Vapd is adjusted by linear computation using a plurality of target values of the reverse bias voltage Vapd for combinations of a plurality of temperatures and a plurality of drive rates a, based on the temperature detected by the temperature sensor 21 and the result of calculation of the drive rate a.

By this, even when the optical transceiver 101 performs different operations according to the communication state, specifically, for example, operations with different burst duty ratios of a burst optical signal, and accordingly, the power consumption changes and the amount of heat generated changes, the optical transceiver 101 can perform control according to a change in temperature detected by the temperature sensor. Specifically, for example, by performing feedforward control using the lookup tables ta1 and ta2, according to the temperature detected by the temperature sensor 21 and the duty ratio a, the reverse bias voltage Vapd applied to the light receiving element PD can be favorably adjusted according to the temperature of the light receiving element PD.

Therefore, in the method of controlling the light receiving element PD according to the first embodiment of the present invention, the bias voltage applied to the light receiving element can be favorably adjusted.

Next, another embodiment of the present invention will be described using drawings. Note that the same or corresponding portions in the drawings are denoted by the same reference signs and description thereof is not repeated.

Second Embodiment

The present embodiment relates to an ONU whose disposition is changed from that of an ONU according to the first embodiment. Except for content described below, the ONU is the same as the ONU according to the first embodiment.

Figure 27:
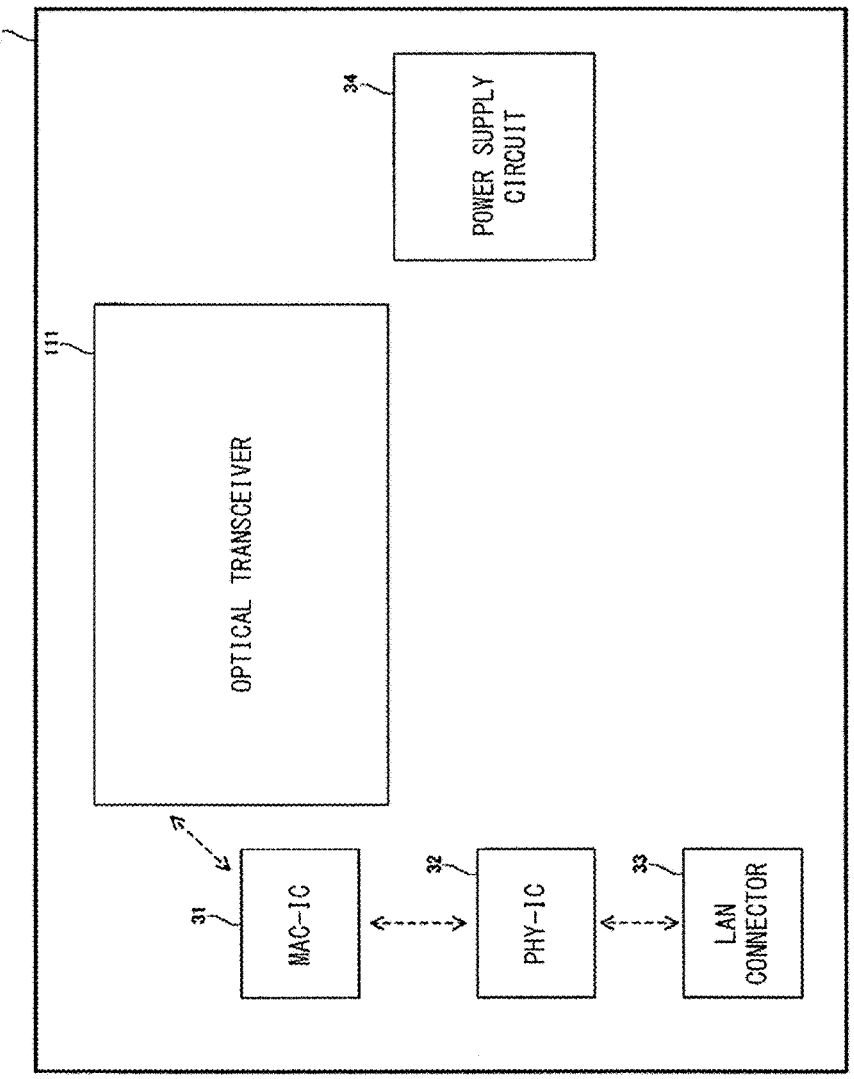
FIG. 27 is a diagram schematically showing an example of the disposition of each component in an ONU according to a second embodiment of the present invention.

FIG. 27 is a diagram schematically showing an example of the disposition of each component in an ONU according to a second embodiment of the present invention.

Referring to FIG. 27, an ONU 212 includes a main substrate B11. On the main substrate B11 are mounted an optical transceiver 111, a MAC-IC 31, a PHY-IC 32, a LAN connector 33, and a power supply circuit 34.

Namely, the ONU 212 is configured to not include a sub-substrate, and the optical transceiver 111 is directly mounted on the main substrate B11.

For example, the MAC-IC 31, the PHY-IC 32, and the LAN connector 33 correspond to those of the units of the ONU 202 shown in FIG. 2 other than the optical transceiver 101. The power supply circuit 34 supplies power to each unit in the ONU 212.

Figure 28:
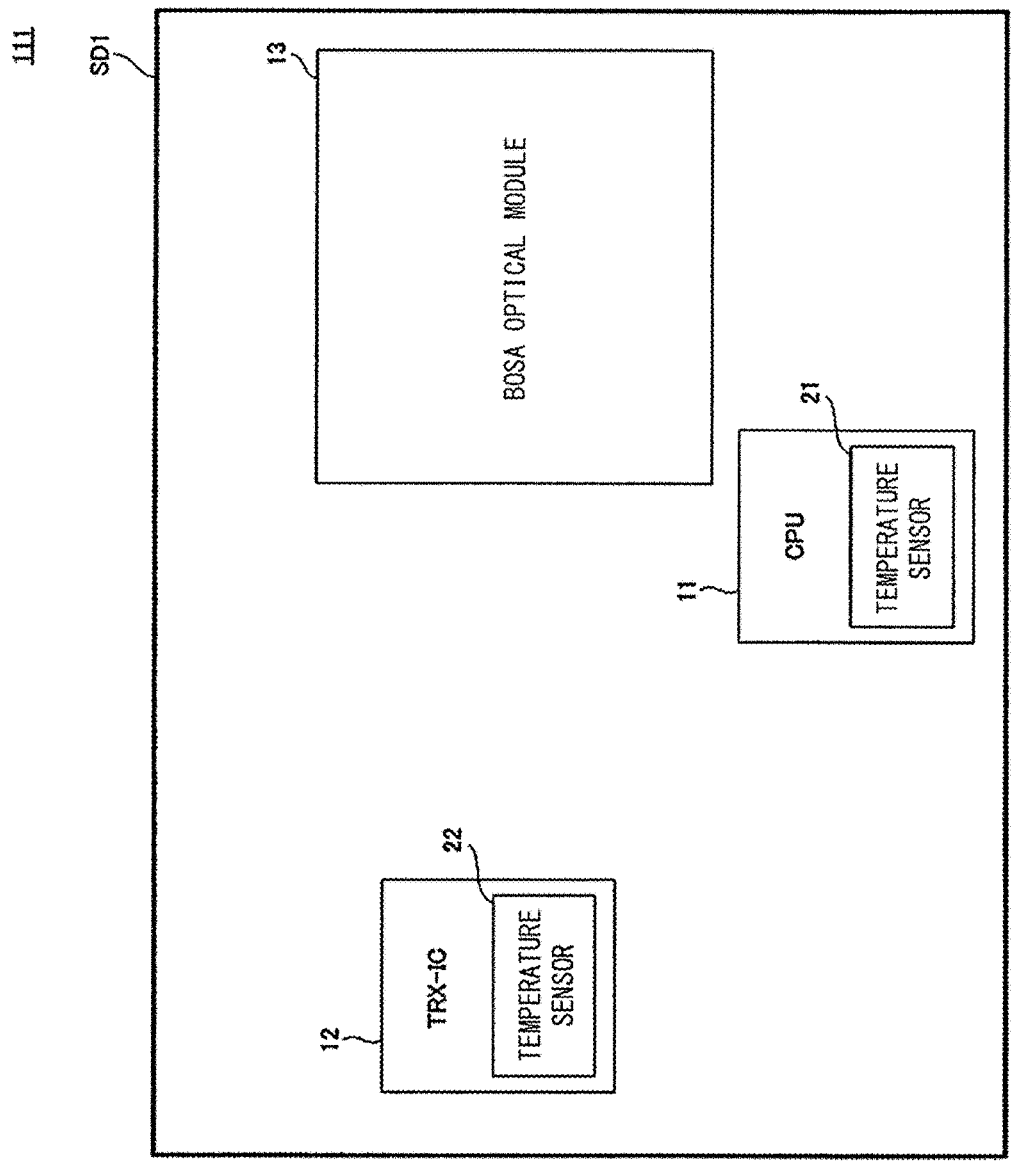
FIG. 28 is a diagram schematically showing an example of the disposition of each component in an optical transceiver according to the second embodiment of the present invention.

FIG. 28 is a diagram schematically showing an example of the disposition of each component in the optical transceiver according to the second embodiment of the present invention.

Referring to FIG. 28, in the optical transceiver 111, a CPU 11, a TRX-IC 12, and a BOSA optical module 13 are covered by a metal shield SD1.

The distance between a temperature sensor 21 and the BOSA optical module 13 is less than or equal to the distance between the TRX-IC 12 and the BOSA optical module 13.

More specifically, for example, the CPU 11 is disposed at a location near the BOSA optical module 13 and away from the TRX-IC 12.

In addition, a direction in which the TRX-IC 12 and the BOSA optical module 13 are arranged intersects a direction in which the CPU 11 and the BOSA optical module 13 are arranged.

In addition, the TRX-IC 12 and the BOSA optical module 13 are disposed near both edges in a longitudinal direction of the metal shield SD1, respectively, and the CPU 11 is disposed near a middle part in the longitudinal direction of the metal shield SD1 and near one edge in a lateral direction of the metal shield SD1.

The same control of a reverse bias voltage Vapd as that of the optical transceiver 101 according to the first embodiment of the present invention can also be applied to the optical transceiver 111 having such disposition.

As described above, in the optical transceiver according to the second embodiment of the present invention, the distance between the temperature sensor 21 and the BOSA optical module 13 is less than or equal to the distance between a transmission driver DV and the BOSA optical module 13.

As such, in a configuration in which the temperature sensor 21 and the BOSA optical module 13 are brought close to each other so that the temperature sensor 21 can more accurately simulate the temperature of the BOSA optical module 13, the influence exerted on the BOSA optical module 13 by the transmission driver DV is accurately grasped and the reverse bias voltage Vapd applied to a light receiving element PD can be favorably adjusted according to the temperature of the light receiving element PD.

Other configurations and operations are the same as those of the ONU according to the first embodiment and thus a detailed description is not repeated here.

The above-described embodiments are to be considered in all respects as illustrative and not restrictive. The scope of the present invention is indicated by the claims rather than the foregoing description, and all changes which come within the meaning and range of equivalency of the claims are therefore intended to be embraced therein.

The above-described description includes features additionally noted below.

[Additional Note 1]

An optical transceiver including:

a temperature sensor;

an integrated circuit capable of performing a computation process using a temperature detected by the temperature sensor;

an optical module including a light emitting element and a light receiving element;

a transmission driver that drives the light emitting element; and a casing that has thermal conductivity and accommodates the temperature sensor, the integrated circuit, the optical module, and the transmission driver, wherein a difference between a temperature detected by the temperature sensor in a transmission on state of an optical signal by the light emitting element and a temperature detected by the temperature sensor in a transmission off state of the optical signal is greater than 2° C., power consumption of the transmission driver is higher than power consumption of the integrated circuit and power consumption of the optical module, the integrated circuit includes the temperature sensor, the light receiving element is capable of changing a multiplication factor by a bias voltage, the optical signal is a burst-like optical signal, and the optical transceiver is used in an optical network unit in a PON system.

[Additional Note 2]

An optical transceiver including:

a first temperature sensor;

a second temperature sensor;

an optical module including a light emitting element and a light receiving element;

a transmission driver that drives the light emitting element, the second temperature sensor being thermally coupled to the transmission driver; and a casing that has thermal conductivity and accommodates the first temperature sensor, the second temperature sensor, the optical module, and the transmission driver, wherein a drive rate of the transmission driver is set as a, a temperature detected by the first temperature sensor is set as T1, a temperature detected by the second temperature sensor is set as T2, a temperature of a light receiving unit in the optical module is set as Tr, and a temperature error allowed for control of the light receiving unit in the optical module is set as Terr, and when, in a state in which an ambient temperature of the casing in a transmission on state of an optical signal by the light emitting element is a predetermined temperature, a value of Tr that can be estimated from T1 and T2 with a being a minimum value is set as Tmin, and a value of Tr that can be estimated from T1 and T2 with a being a maximum value is set as Tmax, an error in a measured value of Tr with respect to an estimated value of Tr is Terr or less, the estimated value being obtained by internally dividing Tmin and Tmax by a when a is a median value of the minimum value and the maximum value, the light receiving element is capable of changing a multiplication factor by a bias voltage, the optical signal is a burst-like optical signal, and the optical transceiver is used in an optical network unit in a PON system.

[Additional Note 3]

An optical communication apparatus including:

a light emitting element;

a transmission driver that drives the light emitting element;

a light receiving element capable of changing a multiplication factor by a bias voltage;

a temperature sensor;

a computing unit that calculates a drive rate of the transmission driver; and an adjusting unit that adjusts the bias voltage applied to the light receiving element, wherein the adjusting unit adjusts the bias voltage by linear computation using a plurality of target values of the bias voltage for combinations of a plurality of temperatures and a plurality of drive rates, based on a temperature detected by the temperature sensor and a result of calculation of the drive rate, the optical communication apparatus further includes a memory unit that stores correspondence relationships between a target value of the bias voltage and a temperature for each drive rate, the adjustment of the bias voltage by the adjusting unit is performed, based on a plurality of target values appropriate to a temperature detected by the temperature sensor in the correspondence relationships and a result of calculation of the drive rate, the light emitting element transmits a burst-like optical signal, the drive rate is a burst duty ratio of the optical signal, and the optical communication apparatus is an optical network unit in a PON system.

REFERENCE SIGNS LIST

11: CPU
12: TRX-IC
13: BOSA OPTICAL MODULE
14: RESISTOR
15: DC/DC CONVERTER
16: CONNECTOR
21 and 22: TEMPERATURE SENSOR
23: MEMORY UNIT
31: MAC-IC
32: PHY-IC
33: LAN CONNECTOR
34: POWER SUPPLY CIRCUIT
36: BIAS LIMITING UNIT
81: TIA
82: LIA
83: BIAS CONTROL UNIT (ADJUSTING UNIT)
84: INTEGRATOR CIRCUIT (COMPUTING UNIT)
85: OUTPUT BUFFER
86: PRE-AMPLIFIER
87: OUTPUT BUFFER CIRCUIT (MODULATION CURRENT SUPPLY CIRCUIT)
88: BIAS CURRENT SUPPLY CIRCUIT
89: LIGHT EMITTING CIRCUIT
92: PON RECEPTION PROCESSING UNIT
93: BUFFER MEMORY
94: UN TRANSMISSION PROCESSING UNIT
95: UNI PORT
96: UN RECEPTION PROCESSING UNIT
97: BUFFER MEMORY
98: PON TRANSMISSION PROCESSING UNIT
99: CONTROL UNIT
101 and 111: OPTICAL TRANSCEIVER
151: BURST TRANSMITTING UNIT
152: RECEIVING UNIT
201: OPTICAL LINE TERMINAL
202, 202A, 202B, 202C, and 212: ONU
301: PON SYSTEM
B1: SUB-SUBSTRATE
B11: MAIN SUBSTRATE
SD1: METAL SHIELD
SP: SPLITTER
OPTF: OPTICAL FIBER
LD: LIGHT EMITTING ELEMENT
L1 and L2: INDUCTOR
PD: LIGHT RECEIVING ELEMENT

The invention claimed is:

1. An optical communication apparatus comprising:
a light emitting element;
a transmission driver that drives the light emitting element;
a light receiving element capable of changing a multiplication factor by a bias voltage;
a temperature sensor;
a computing unit that calculates a drive rate of the transmission driver; and
an adjusting unit that adjusts the bias voltage applied to the light receiving element, wherein
the adjusting unit adjusts the bias voltage by linear computation using a plurality of target values of the bias voltage for combinations of a plurality of temperatures and a plurality of drive rates, based on a temperature detected by the temperature sensor and a result of calculation of the drive rate.

2. A method of controlling a light receiving element in an optical communication apparatus including a light emitting element; a transmission driver that drives the light emitting element; a light receiving element capable of changing a multiplication factor by a bias voltage; and a temperature sensor, the method comprising the steps of:

calculating a drive rate of the transmission driver; and
adjusting the bias voltage applied to the light receiving element, wherein
in the step of adjusting the bias voltage, the bias voltage is adjusted by linear computation using a plurality of target values of the bias voltage for combinations of a plurality of temperatures and a plurality of drive rates, based on a temperature detected by the temperature sensor and a result of calculation of the drive rate.

3. An optical transceiver comprising:
a temperature sensor;
an optical module including a light emitting element and a light receiving element capable of changing a multiplication factor by a bias voltage;
a transmission driver that drives the light emitting element;
a computing unit that calculates a drive rate of the transmission driver; and
an adjusting unit that adjusts the bias voltage applied to the light receiving element, wherein
the adjusting unit adjusts the bias voltage by linear computation using a plurality of target values of the bias voltage for combinations of a plurality of temperatures and a plurality of drive rates, based on a temperature detected by the temperature sensor and a result of calculation of the drive rate.

4. The optical transceiver according to claim 3, further comprising:
an integrated circuit capable of performing a computation process using a temperature detected by the temperature sensor; and
a casing that has thermal conductivity and accommodates the temperature sensor, the integrated circuit, the optical module, and the transmission driver, wherein
a difference between a temperature detected by the temperature sensor in a transmission on state of an optical signal by the light emitting element and a temperature detected by the temperature sensor in a transmission off state of the optical signal is greater than 2° C., and
power consumption of the transmission driver is higher than power consumption of the integrated circuit and power consumption of the optical module.

5. The optical transceiver according to claim 3, wherein the transmission driver is disposed between the temperature sensor and the optical module.

6. The optical transceiver according to claim 3, wherein a distance between the temperature sensor and the optical module is less than or equal to a distance between the transmission driver and the optical module.

7. The optical transceiver according to claim 3, further comprising a memory unit that stores correspondence relationships between a target value of the bias voltage and a temperature for each drive rate, wherein
the adjustment of the bias voltage by the adjusting unit is performed, based on a plurality of target values appropriate to a temperature detected by the temperature sensor in the correspondence relationships and a result of calculation of the drive rate,
the light emitting element transmits a burst-like optical signal, and
the drive rate is a burst duty ratio of the optical signal.

* * * * *